United States Patent
Utsumi

(10) Patent No.: US 7,920,286 B2
(45) Date of Patent: Apr. 5, 2011

(54) IMAGE OUTPUT APPARATUS, HISTORY MANAGEMENT METHOD, AND HISTORY MANAGEMENT PROGRAM

(75) Inventor: Keiko Utsumi, Ebina (JP)

(73) Assignee: Canon Kabushiki Kaisha (JP)

( * ) Notice: Subject to any disclaimer, the term of this patent is extended or adjusted under 35 U.S.C. 154(b) by 946 days.

(21) Appl. No.: 11/745,653

(22) Filed: May 8, 2007

(65) Prior Publication Data

US 2007/0266057 A1 Nov. 15, 2007

(30) Foreign Application Priority Data

May 11, 2006 (JP) ................................. 2006-132608

(51) Int. Cl.
*G06F 3/12* (2006.01)
*G06K 15/00* (2006.01)

(52) U.S. Cl. ........................................ 358/1.15; 358/1.1

(58) Field of Classification Search ................... 358/1.1, 358/1.9, 1.12, 1.13, 1.14, 1.15, 402; 709/200, 709/225, 226, 228; 399/8, 79, 82, 83
See application file for complete search history.

(56) References Cited

U.S. PATENT DOCUMENTS

| | | | |
|---|---|---|---|
| 7,755,783 B2* | 7/2010 | Aritomi et al. ............... | 358/1.14 |
| 2004/0100642 A1* | 5/2004 | Nozato .......................... | 358/1.6 |
| 2005/0094185 A1* | 5/2005 | Hayakawa .................... | 358/1.14 |
| 2005/0174601 A1* | 8/2005 | Sawada ......................... | 358/1.15 |
| 2005/0186003 A1* | 8/2005 | Heiney et al. .................. | 400/76 |
| 2006/0190989 A1* | 8/2006 | Furuya ............................. | 726/2 |
| 2006/0235896 A1* | 10/2006 | Matoba ......................... | 707/200 |

FOREIGN PATENT DOCUMENTS

JP 2004-240571 A 8/2004

* cited by examiner

*Primary Examiner* — Gabriel I Garcia
(74) *Attorney, Agent, or Firm* — Rossi, Kimms & McDowell LLP

(57) ABSTRACT

An image output apparatus permitting entire access history and operation history regarding managed documents to be able to be grasped. A document security server holds and manages a history of accesses from a client PC to the managed documents as an access history DB. A digital multifunction peripheral identifies, from a job received from the PC, a user who has issued a job request and a managed electronic document to be printed, and executes online process or offline process depending whether an authority for execution of the presently received job has been checked for. An output image history DB is saved when output processing corresponding to the job received from the PC is performed online, whereas a job history DB is save when other output processing is performed. The access history DB, the output image history DB, and the job history DB are merged and displayed.

18 Claims, 42 Drawing Sheets

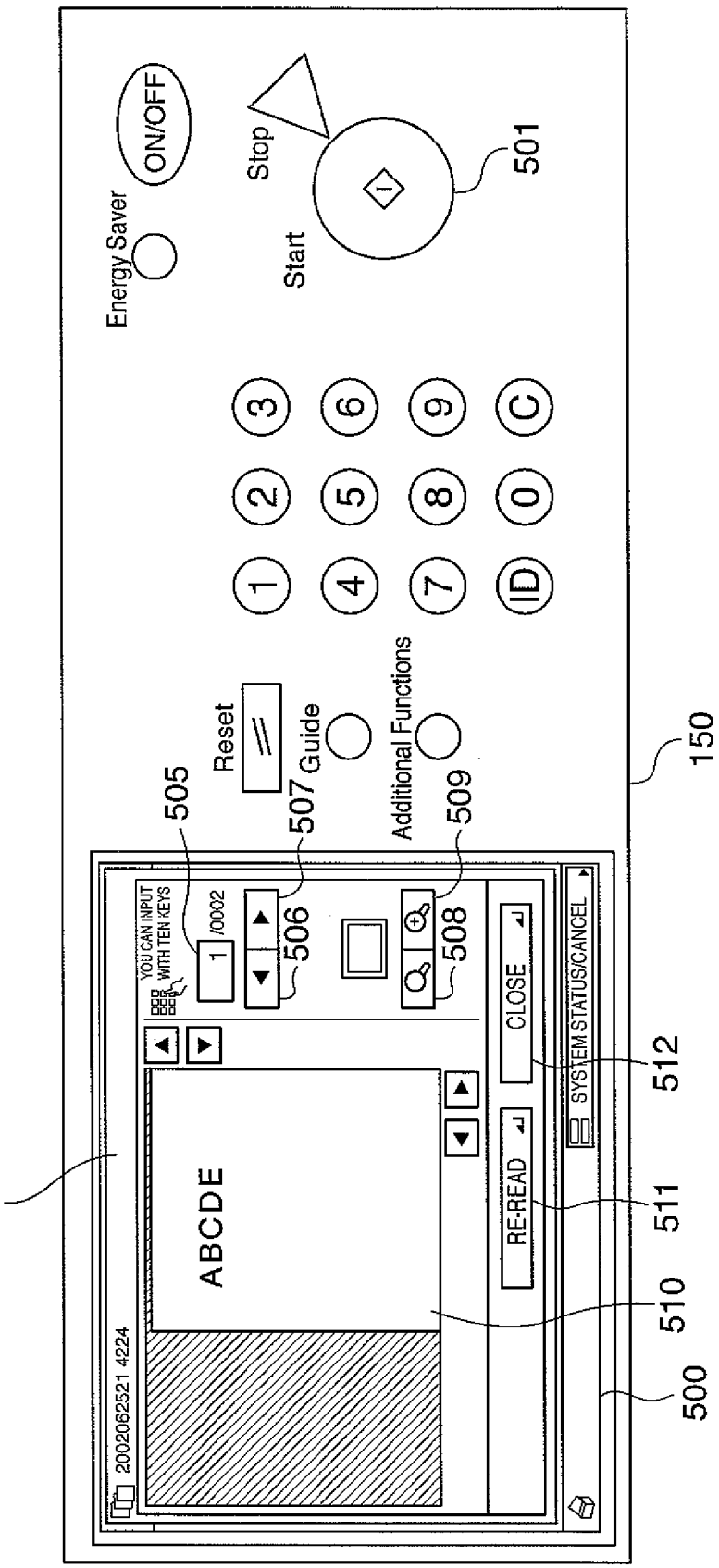

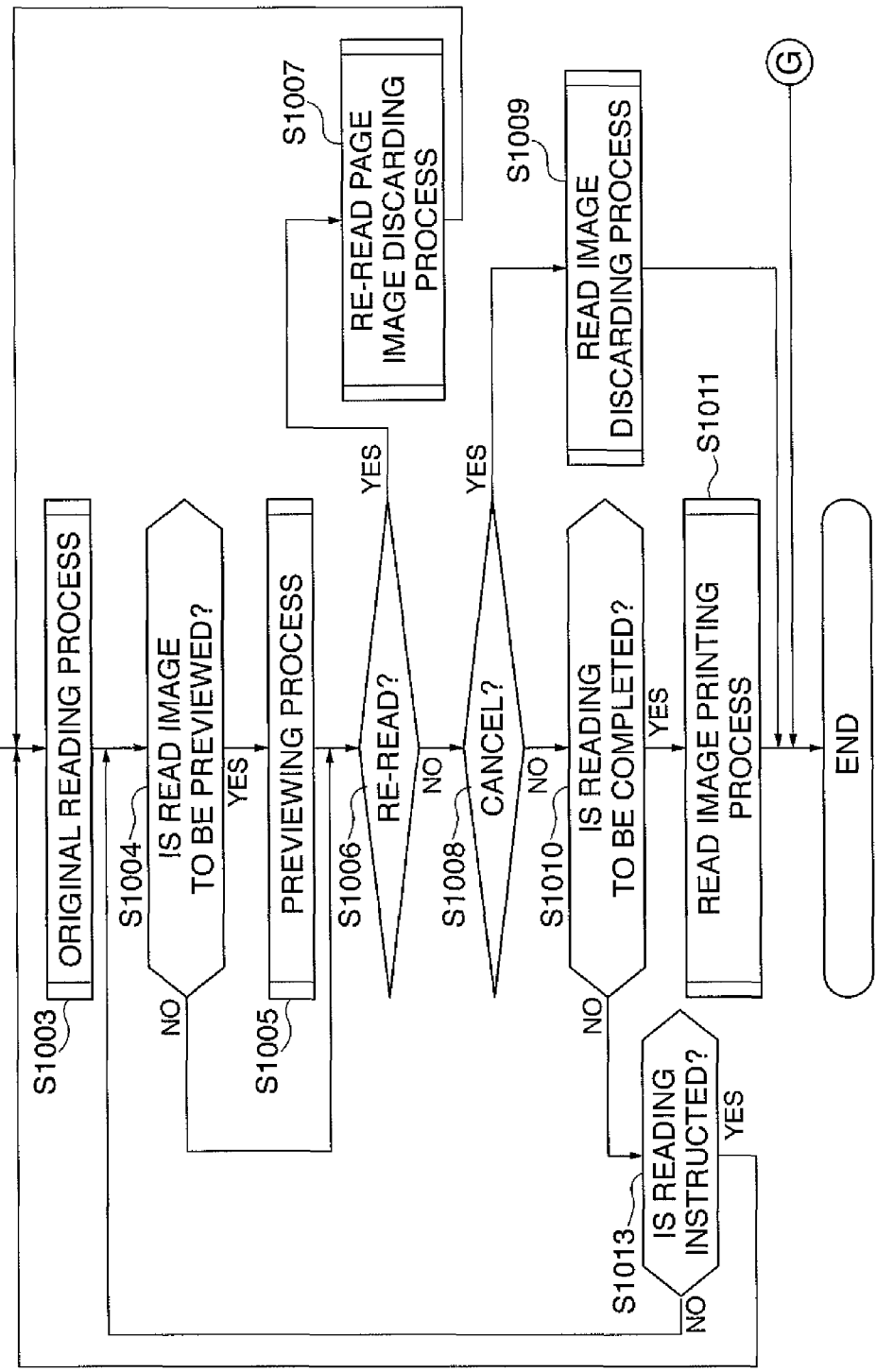

FIG. 19

| LICENSE ID | USER | PERUSE | EDIT | DELETE | PRINT | COPY |
|---|---|---|---|---|---|---|
| #000001 | USER A | ○ | ○ | ○ | ○ | ○ |
| | USER B | ○ | ○ | × | ○ | ○ |
| | USER C | ○ | × | × | ○ | × |
| | USER D | × | × | × | × | × |
| | USER E | ○ | × | × | × | × |
| #000002 | USER A | ○ | ○ | × | ○ | × |
| | USER B | .... | .... | .... | .... | .... |
| .... | | | | | | |

| DATE AND TIME | USER | LICENSE ID | VERSION | OPERATION CONTENT | REMARKS |
|---|---|---|---|---|---|
| 2005/12/01 11:05 | USER B | #000001 | 1.0 | PERUSE | |
| 2005/12/01 11:10 | USER A | #000001 | 1.0 | PERUSE | |
| 2005/12/01 11:15 | USER A | #000001 | 1.1 | EDIT | VERSION UPGRADE |
| 2005/12/01 11:20 | USER B | #000001 | 1.0 | PRINT | DOUBLE-SIDED COLOR/3 COPIES |
| 2005/12/01 11:25 | USER A | #000001 | 1.1 | PRINT | SINGLE-SIDED COLOR/1 COPY |
| 2005/12/01 11:30 | USER B | #000002 | 2.0 | PERUSE | |
| 2005/12/01 11:35 | USER C | #000001 | 1.1 | PERUSE | |
| 2005/12/01 11:40 | USER C | #000001 | 1.1 | PRINT | DOUBLE-SIDED COLOR/1 COPY |
| 2005/12/01 14:00 | USER B | #000002 | 2.0 | PRINT | DOUBLE-SIDED MONOCHROME/1 COPY |

*FIG. 27*

| LICENSE ID | VERSION | IMAGE | | | | |
|---|---|---|---|---|---|---|
| #000001 | 1.0 | A | B | C | ..... | ~ 4101 |
| #000001 | 1.1 | A | B | X | ..... | ~ 4102 |
| #000002 | 2.0 | 1 | 2 | 3 | ..... | ~ 4103 |

FIG. 28

| | DATE AND TIME | USER | LICENSE ID | VERSION | OPERATION CONTENT | IMAGE | | | | OFFLINE | REMARKS |
|---|---|---|---|---|---|---|---|---|---|---|---|
| 4201 | 2005/12/01 10:55 | USER A | #000001 | 1.0 | COPY | A | B | C | ···· | | DOUBLE-SIDED COLOR/1 COPY |
| 4202 | 2005/12/01 11:30 | USER A | #000001 | 1.1 | COPY | A | B | X | ···· | | DOUBLE-SIDED COLOR/10 COPIES |
| 4203 | 2005/12/01 13:00 | USER B | #000001 | 1.5 | COPY | 1 | 2 | 2 | ···· | ○ | DOUBLE-SIDED MONOCHROME/1 COPY |
| 4204 | 2005/12/01 13:10 | USER D | #000001 | 1.1 | PRINT | A | B | X | ···· | ○ | DOUBLE-SIDED MONOCHROME/1 COPY |
| 4205 | 2005/12/01 13:15 | USER C | #000001 | 1.1 | PRINT | A | B | X | ···· | ○ | DOUBLE-SIDED COLOR/15 COPIES |
| 4206 | 2005/12/01 13:20 | USER C | #000001 | 1.0 | COPY | A | B̄ | C | ···· | ○ | DOUBLE-SIDED MONOCHROME/1 COPY |

FIG. 29

| DATE AND TIME | USER | LICENSE ID | VERSION | OPERATION CONTENT | IMAGE | REMARKS |
|---|---|---|---|---|---|---|
| 2005/12/01 13:10 | USER D | #000001 | 1.1 | PRINT | A B X ···· | DOUBLE-SIDED MONOCHROME/1 COPY |
| 2005/12/01 13:20 | USER C | #000001 | 1.0 | COPY | A B̄ C ···· | DOUBLE-SIDED MONOCHROME/1 COPY |

FIG. 30

| DATE AND TIME | USER | LICENSE ID | VERSION | OPERATION CONTENT | IMAGE | | | | OFFLINE | REMARKS |
|---|---|---|---|---|---|---|---|---|---|---|
| 2005/12/01 10:55 | USER A | #000001 | 1.0 | COPY | A | B | C | ... | | DOUBLE-SIDED COLOR/1 COPY |
| 2005/12/01 11:30 | USER A | #000001 | 1.1 | COPY | A | B | X | ... | | DOUBLE-SIDED COLOR/10 COPIES |
| 2005/12/01 13:00 | USER B | #000001 | 1.5 | COPY | 1 | 2 | 2 | ... | ◎ | DOUBLE-SIDED MONOCHROME/1 COPY |
| 2005/12/01 13:10 | USER D | #000001 | 1.1 | PRINT | A | B | X | ... | ● | DOUBLE-SIDED MONOCHROME/1 COPY |
| 2005/12/01 13:15 | USER C | #000001 | 1.1 | PRINT | A | B | X | ... | ◎ | DOUBLE-SIDED COLOR/15 COPIES |
| 2005/12/01 13:20 | USER C | #000001 | 1.0 | COPY | A | B̄ | C | ... | ● | DOUBLE-SIDED MONOCHROME/1 COPY |

FIG. 31

| DATE AND TIME | USER | LICENSE ID | VERSION | OPERATION CONTENT | OPERATION ROUTE | IMAGE | OFFLINE | ERROR OPERATION | REMARKS |
|---|---|---|---|---|---|---|---|---|---|
| 2005/12/01 10:55 | USER A | #000001 | 1.0 | COPY | MFP | A B C ..... | | | DOUBLE-SIDED COLOR/1 COPY |
| 2005/12/01 11:05 | USER B | #000001 | 1.0 | PERUSE | TERMINAL APPARATUS | | | | |
| 2005/12/01 11:10 | USER A | #000001 | 1.0 | PERUSE | TERMINAL APPARATUS | | | | VERSION UPGRADE |
| 2005/12/01 11:15 | USER A | #000001 | 1.1 | EDIT | TERMINAL APPARATUS | | | | |
| 2005/12/01 11:20 | USER B | #000001 | 1.0 | PRINT | TERMINAL APPARATUS | A B C | | | DOUBLE-SIDED COLOR/3 COPY |
| 2005/12/01 11:25 | USER A | #000001 | 1.1 | PRINT | TERMINAL APPARATUS | A B X | | | DOUBLE-SIDED COLOR/1 COPY |
| 2005/12/01 11:30 | USER B | #000002 | 2.0 | PERUSE | TERMINAL APPARATUS | | | | |
| 2005/12/01 11:30 | USER A | #000001 | 1.1 | COPY | MFP | A B X ..... | | | DOUBLE-SIDED COLOR/10 COPIES |
| 2005/12/01 11:35 | USER C | #000001 | 1.1 | PERUSE | TERMINAL APPARATUS | | | | |
| 2005/12/01 11:40 | USER C | #000001 | 1.1 | PRINT | TERMINAL APPARATUS | A B X | | | DOUBLE-SIDED COLOR/1 COPY |
| 2005/12/01 13:00 | USER B | #000001 | 1.5 | COPY | MFP | 1 2 X | ○ | | DOUBLE-SIDED MONOCHROME/1 COPY |
| 2005/12/01 13:10 | USER D | #000001 | 1.1 | PRINT | MFP | A B X ..... | ○ | ○ | DOUBLE-SIDED MONOCHROME/1 COPY |
| 2005/12/01 13:15 | USER C | #000001 | 1.1 | PRINT | MFP | A B X ..... | ○ | | DOUBLE-SIDED MONOCHROME/1 COPY |
| 2005/12/01 13:20 | USER C | #000001 | 1.0 | COPY | MFP | A B̄ C ..... | ○ | ○ | DOUBLE-SIDED COLOR/15 COPIES |
| 2005/12/01 14:00 | USER B | #000002 | 2.0 | PRINT | TERMINAL APPARATUS | 1 2 3 | | | DOUBLE-SIDED MONOCHROME/1 COPY |

IMAGE OUTPUT APPARATUS, HISTORY MANAGEMENT METHOD, AND HISTORY MANAGEMENT PROGRAM

BACKGROUND OF THE INVENTION

1. Field of the Invention

The present invention relates to an image output apparatus, a history management method, and a history management program.

2. Description of the Related Art

In recent years, business enterprises have had to take measures to prevent leakage of business information they handled. Electronic documents, which are document data such as image files and document files, are extremely convenient for information exchange but are highly risky for leakage of information due to their ease of distribution. In this regard, there is known an application for use for creation of electronic documents, which makes it possible to set in detail the authority to access electronic documents.

For example, Japanese Laid-open patent publication no. 2004-240571 discloses a document access control method in which a document stored in a document DB (database) is read out for output via an operation/perusal unit in response to an access request inputted via the operation/perusal unit. This document access control method uses a rule DB in which rules including conditions for readout of documents stored in the document DB are set on a document-by-document basis. Each document stored in the document DB is read out for analysis in accordance with an access request, whereby unified control of accesses to documents in the document DB can be achieved.

In the case, for example, of electronic PDF (portable document format) documents, access authority can be set not only for the purposes of referencing and changing the electronic documents but also for the purposes of printing the electronic documents and setting print specifications. Coordination with a user authentication system permits more detailed settings in respect of users of the electronic documents.

As an example of collective management of information on authority to access electronic documents, there is known Adobe Policy Server (registered trademark) using a server which is on a network and is provided with a database for use for management of authorities to access electronic documents or the like. The Adobe Policy Server provides a consistent dynamic policy for electronic documents in designating users and usage methods of electronic documents, thereby realizing safety electronic document management. In particular, the security policy can be changed by a creator of electronic documents even after the electronic documents are distributed, making it possible for a manager to carry out the management and monitoring of electronic documents irrespective of wherever the electronic documents are present. Furthermore, an offline policy can be set to provide the security policy even in unconnectable condition. As a result, access control can be implemented at user level and can be carried out during the time the server is offline.

Furthermore, there is provided a function of enabling the manager to perform tracking of an operation history of the managed electronic documents (which are the documents to which the security policy is applied by the Policy Server). The Adobe Policy Server is capable of retaining an access history that indicates what has been made by whom and when. Therefore, tracking can be performed if document leakage is caused by some trouble.

With the document access control method disclosed in the above described Japanese Laid-open patent publication no. 2004-240571, access restriction can be designated even during the time an access management server or a network is in offline or shut down. However, in the case of a print or copy operation being made, a document is outputted as hard data, which makes it difficult to carry out tracking of the outputted data. In addition, the offline policy does not always have an authority lower than user's policy, and thus there is a possibility of permitting a user to carry out an operation beyond user's access authority.

With the document access control method disclosed in the above described Japanese laid-open patent publication no. 2004-240571, it is possible to perform collective management and monitoring of restriction of access to managed electronic documents. In that case, however, a dedicated application program must be used and electronic documents must be compatible with an application-specific format. Therefore, this method is not applicable to non-electronic data such as paper documents of different format nor to image format data (such as bit-map data) converted from data, which has a format processable by the dedicated application, when the data is spooled into a hard disk of a copy machine or the like.

Although the Policy Server is capable of retaining an access history indicating operations performed by terminal apparatuses on managed electronic documents, only file operations performed via the dedicated application can be recorded in the access history. In a case where a managed electronic document is operated by a copy machine or the like not installed with the dedicated application, therefore, no access history can be left, making it impossible to manage the entire history of accesses to the documents.

Under these circumstances, collective access management and tracking of history of accesses to data such as paper data other than electronic data have not been realized, which can be performed as with the case of electronic data. Thus, improvement in the security level has been demanded.

SUMMARY OF THE INVENTION

The present invention provides an image output apparatus, a history management method, and a history management program that permit entire access history and operation history for managed documents to be able to be grasped.

According to a first aspect of the present invention, there is provided an image output apparatus connected via a network to at least one terminal apparatus and to a document management apparatus adapted to record access history information indicating a history of accesses to document data, comprising a reception unit adapted to receive an output request for output of document data to which the terminal apparatus has accessed, an execution unit adapted to execute processing based on the output request received by the reception unit, a processing history record unit adapted to record processing history information indicating a history relating to the processing executed by the execution unit, and a control unit adapted to perform control such that, in a case where a history of accesses from the terminal apparatus to the document data for which the output request has been received by the reception unit has not been recorded as the access history information in the document management apparatus, a history relating to processing performed on the document data by the execution unit based on the output request and information indicating that a history of accesses from the terminal apparatus to the document data has not been recorded in the document management apparatus are recorded as processing history information in the processing history record unit.

According to second aspect of the present invention, there is provided an image output apparatus connected via a network to a document management apparatus adapted to record access history information indicating a history of accesses to document data, comprising an input unit adapted to input document data, an execution unit adapted to execute output processing on the document data inputted by the input unit, a processing history record unit adapted to record processing history information indicating a history relating to the output processing executed by the execution unit, and an access unit adapted to access the document management apparatus based on information to make access to the document management apparatus in a case where the information to make access to the document management apparatus is extracted from the document data on which the execution unit has executed the output processing, the access unit being adapted to transmit to the document management apparatus the processing history information relating to the output processing executed by the execution unit in a case where the access unit can access the document management apparatus, and the processing history record unit being adapted to record the processing history information relating to the output processing executed by the execution unit and information indicating that history information relating to the output processing has not been transmitted to the document management apparatus in a case where the access unit cannot access the document management apparatus.

According to third and fourth aspects of the present invention, there are provided history management methods each for a corresponding one of the image output apparatuses according to the first and second aspects of this invention.

According to fifth and sixth aspects of the present invention, there are provided history management programs each for causing a computer to execute a corresponding one of history management methods according to the third and fourth aspects of this invention.

According to the present invention, the access history that cannot be recorded as history information in the document management apparatus can be supplemented by processing history information recorded in the image output apparatus, making it possible to record the history of accesses to documents with reliability.

It is also possible to record the history of access to documents without using a dedicated application program.

Furthermore, the access history can be recorded irrespective of the format of documents for which the access history is to be recorded.

Further features of the present invention will become apparent from the following description of exemplary embodiments with reference to the attached drawings.

BRIEF DESCRIPTION OF THE DRAWINGS

FIG. 12 is a diagrams showing an example of an original reading confirmation screen displayed on the operating unit;

FIGS. 13A and 13B are a flowchart showing the procedure of a sequential-reading/copying process;

FIG. 19 is a view showing an example of an access authority information DB managed by the document security server;

FIG. 20 is a view showing an example of an access history DB for managed electronic documents stored in and managed by the document security server;

FIG. 27 is a view showing an example of an output image history DB in which the history of output image is saved when a job requested by the client PC is outputted from the digital multifunction peripheral;

FIG. 28 is a view showing an example of a job history DB that is comprised of the history of jobs requested from the operating unit of the digital multifunction peripheral and the history of jobs implemented in the offline process;

FIG. 29 is a view showing an error operation involving job history indicating error operations in the offline process;

FIG. 30 is a view showing an example of a renewed job history DB that has been renewed by a process in a step S5604 in FIG. 38;

FIG. 31 is a view showing an example of the entirety of the job history DB;

DETAILED DESCRIPTION OF THE PREFERRED EMBODIMENT

The present invention will now be described in detail below with reference to the drawings showing a preferred embodiment thereof.

In the following, the basic construction of the present invention will be described with reference mainly to FIGS. 1 to 15, and the construction of characterizing parts of the present invention will be described with reference mainly to FIGS. 16 to 40.

Figure 1:
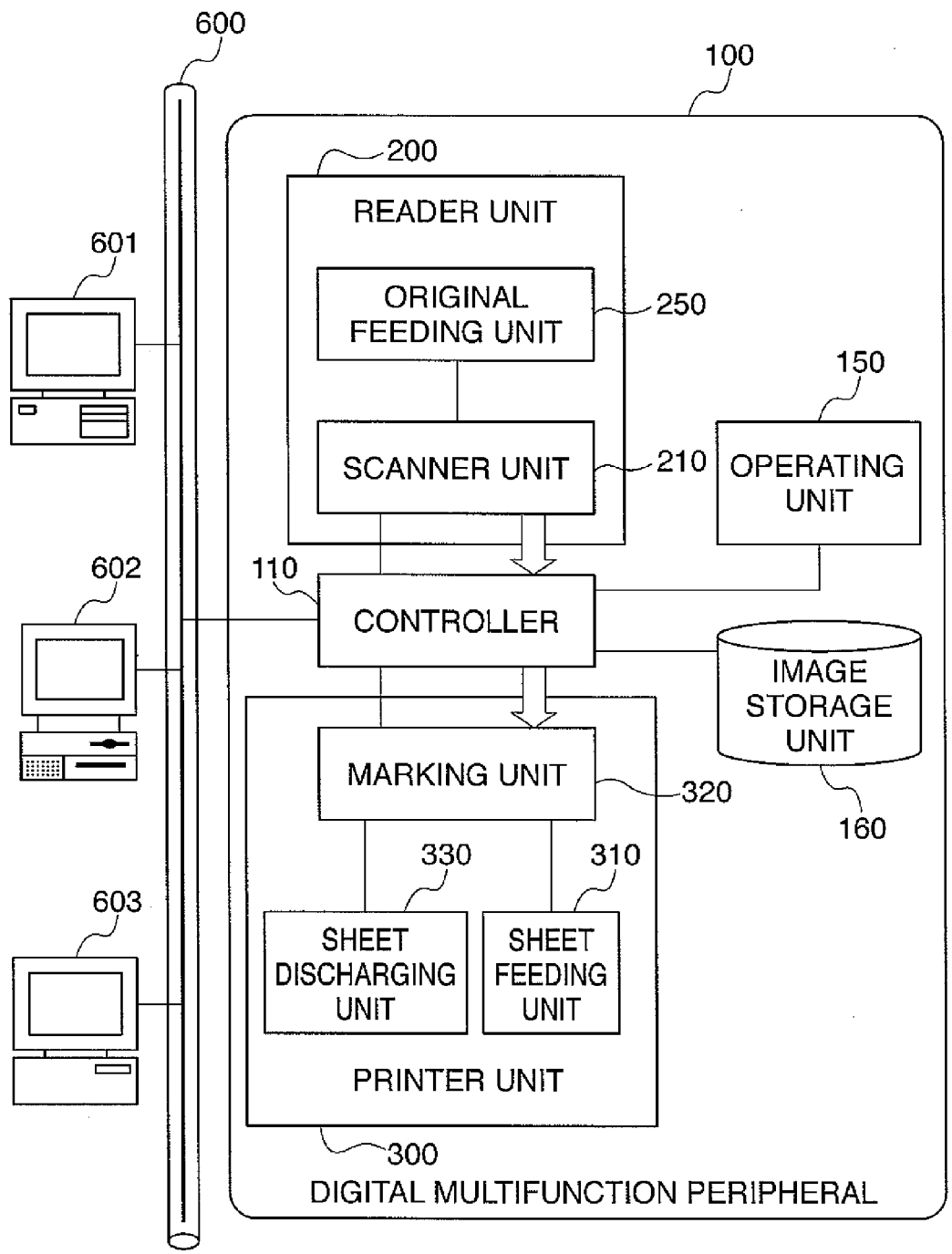
FIG. 1 is a block diagram showing the construction of an image processing apparatus as an example of an image output apparatus according to one embodiment of the present invention applied to an image processing system.

FIG. 1 is a block diagram showing the construction of an image processing apparatus as an example of an image output apparatus according to one embodiment of the present invention, which is applied to an image processing system. It is assumed in this embodiment that the image processing apparatus is comprised of a digital multifunction peripheral (MFP) having a plurality of functions. The whole construction of the image processing system to which the image output apparatus of this embodiment will be described later with reference to FIG. 16.

As shown in FIG. 1, the digital multifunction peripheral 100 and a plurality of host computers (hereinafter referred to as "the PCs") 601, 602 are connected to a LAN (local area network) 600 such as an Ethernet (registered trademark) LAN. The digital multifunction peripheral 100 is comprised of a reader unit 200 for reading an image on an original, a printer unit 300 for forming an image on a sheet, an operating unit 150, an image storage unit 160, and a controller 110.

The reader unit 200 is comprised of an original feeding unit 250 that feeds originals on a sheet-by-sheet basis, and a scanner unit 210 that optically reads an image on an original fed from the original feeding unit 250, converts the read image into image data, and outputs the image data.

The printer unit 300 is comprised of a sheet feeding unit 310 having a plurality of sheet cassettes in which sheets are housed, a marking unit 320 that transfers image data to a sheet and fixes the transferred image data, and a sheet discharging unit 330 that sorts and staples sheets having images formed thereon and discharges the sheets to the outside. The operating unit 150 includes various hard keys and a liquid crystal panel for displaying/setting image data and various functions.

The image storage unit 160 is comprised of a hard disk drive (HDD) for storing image data read by the reader unit 200, image data generated from code data received from the PCs 601 and 602 via the LAN 600, and so forth. A CD-R drive, a DVD-R drive, or the like may also be used as a storage device constituting the image storage unit 160.

The controller 110 controls the reader unit 200 and the printer unit 300 to provide a copying function of causing the reader unit 200 to read image data from an original and causing the printer unit 300 to form an image on a sheet based on the read image data. The controller 110 also carries out control to provide a scanner function of converting image data read from an original by the reader unit 200 into code data and transmitting the code data to the PCs 601 and/or 602 via the LAN 600, a printer function of converting the code data received from the PCs 601 and/or 602 via the LAN 600 into image data and outputting the image data to the printer unit 300, a transfer function, and so forth.

Figure 2:
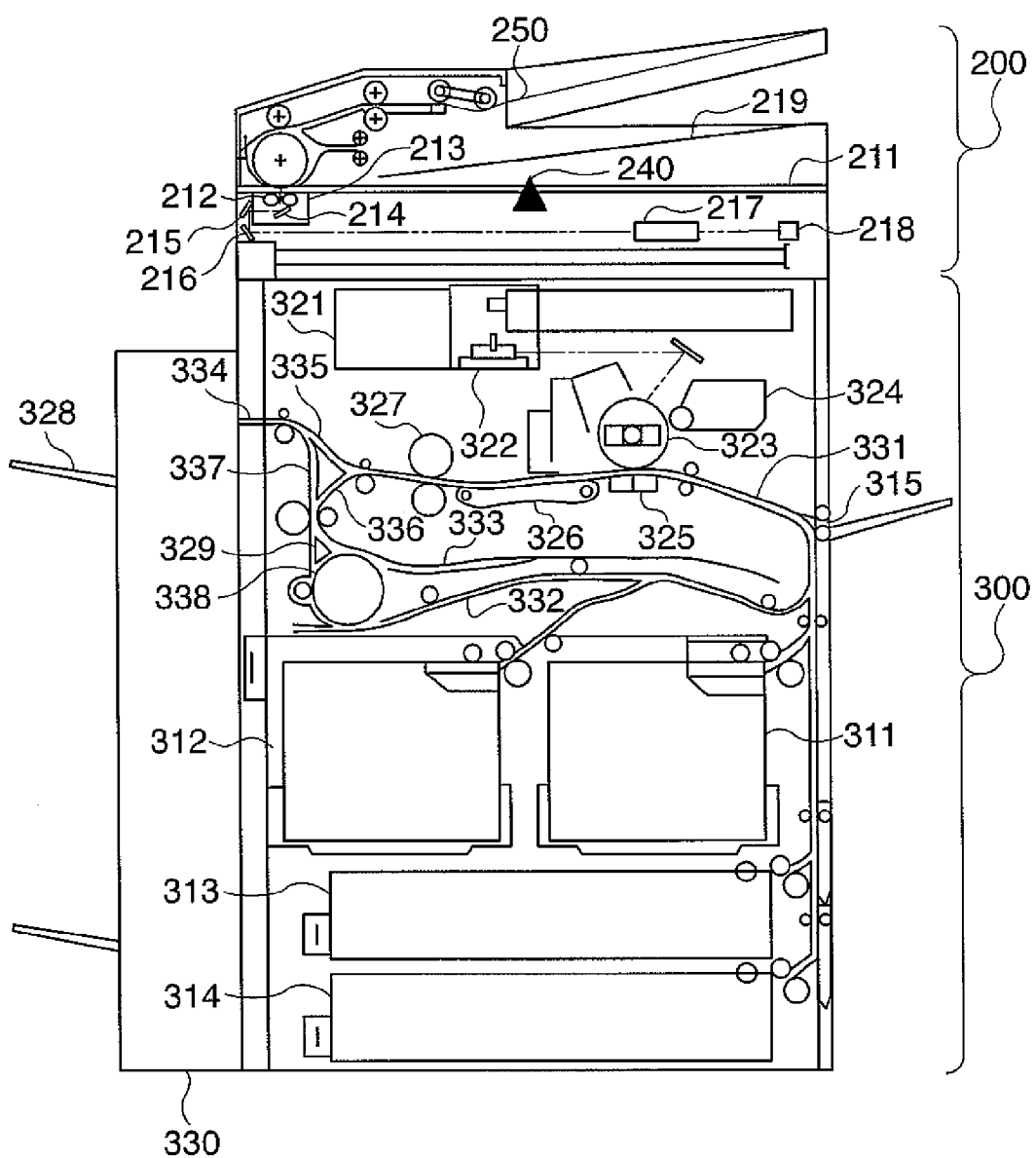
FIG. 2 is a vertical cross section view showing the mechanical construction of a digital multifunction peripheral shown in FIG. 1.

The digital multifunction peripheral 100 according to the present embodiment is comprised of the reader unit 200 and the printer unit 300, which are configured as an integral unit, and the mechanical construction thereof will now be described with reference to FIG. 2. FIG. 2 is a longitudinal sectional view showing the mechanical construction of the digital multifunction peripheral 100 in FIG. 1.

In the reader unit 200, the original feeding unit 250 feeds originals stacked thereon onto a platen glass 211 on a sheet-by-sheet basis in a predetermined order, and the scanner unit 210 (see FIG. 1) reads the fed originals. After reading of each original is completed, the original on the platen glass 211 is discharged to a discharge tray 219.

In the reading operation carried out by the scanner unit 210, when an original is fed onto the platen glass 211, a lamp 212 for illuminating the original from below is turned on, and an optical unit 213 is caused to start moving to scan the original. Reflected light from the original is guided to a CCD image sensor (hereinafter referred to as "the CCD") 218 via a plurality of mirrors 214, 215, and 216, and a lens 217, and the CCD 218 converts a scanned image on the original into image data and outputs the image data. The image data output from the CCD 218 is subjected to predetermined processing, and the resultant image data is transferred to the controller 110 (see FIG. 1).

The reader unit 200 is also capable of carrying out moving original reading in which an original fed from the original feeding unit 250 passes through a moving original reading location 240 on the platen glass 211 at a constant speed. The optical unit 213 is moved to the moving original reading location 240 where the original being conveyed at a constant speed is illuminated by the lamp 212 and an image on the original is read by the CCD 218.

The printer unit 300 includes a laser driver 321 that drives a laser emitting section 322 in accordance with image data output from the controller 110. A laser beam emitted from the laser emitting section 322 driven by the laser driver 321 scans a photosensitive drum 323 by exposure. As a result, an electrostatic latent image corresponding to the laser beam is formed on the photosensitive drum 323, and the electrostatic latent image is visualized as a toner image by toners supplied from a developing unit 324.

In synchronization with the laser emitting section 322 starting the emission of the laser beam, the toner image is transferred onto a sheet fed from any of cassettes 311, 312, 313, and 314 or a manual sheet feed tray 315 constituting the sheet feeding unit 310 via a conveying path 331 by a transfer unit 325. The sheet onto which the toner image has been transferred is conveyed to a fixing unit 327 via a conveying belt 326. The fixing unit 327 fixes the toner image on the sheet by means of heating and pressing. The sheet that has passed through the fixing unit 327 is conveyed to a sheet discharging unit 330 via a conveying path 335 and a conveying path 334. The sheet discharging unit 330 performs sheet processing (sorting and stapling of sheets) on the sheets and discharges the sheets on which the sheet processing has been performed to a sheet discharge bin 328.

In the case where the sheet is discharged after the sheet surface on which the image has been formed is turned over, the sheet is guided to a conveying path 336 and a conveying path 338 and then conveyed in the reverse direction to the sheet discharging unit 330 via a conveying path 337 and the conveying path 334.

In the case of double-sided printing, the sheet that has passed through the fixing unit 327 is guided from the conveying path 336 to a conveying path 333 by a flapper 329 and then directed in the reverse direction by the flapper 329 to a sheet refeeding conveying path 332 via the conveying path 338. Thereafter, the sheet directed to the sheet refeeding conveying path 332 is fed to the transfer unit 325 via the conveying path 331.

Figure 3:
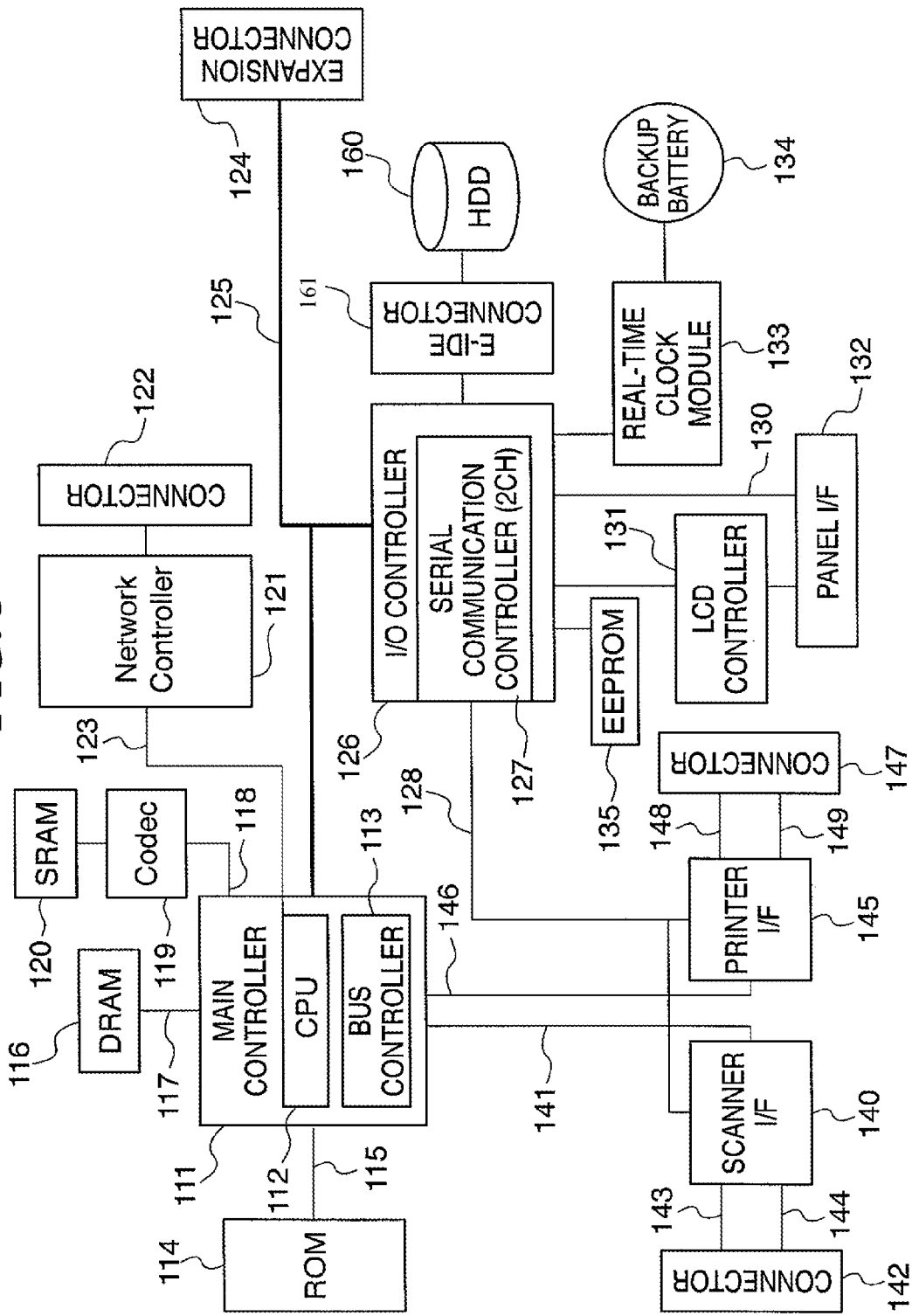
FIG. 3 is a block diagram showing the internal construction of a controller shown in FIG. 1.

Referring next to FIG. 3, a detailed description will be given of the controller 110. FIG. 3 is a block diagram showing the internal construction of the controller in FIG. 1.

As shown in FIG. 3, the controller 110 incorporates therein a main controller 111. The main controller 111 includes a CPU 112, a bus controller 113, and a functional block, not shown, having various controller circuits, described later. The controller 110 is connected to a ROM 114 via a RON I/F 115, to a DRAM 116 via a DRAM I/F 117, to a codec 119 via a codec I/F 118, and to a network controller 121 via a network I/F 123.

The ROM 114 stores various control programs executed by the CPU 112 of the main controller 111 and computation data. The DRAM 116 is used as a work area for use by the CPU 112, and is also used to store image data. The codec 119 compresses raster image data stored in the DRAM 116 using a known compression method such as MH, MR, MMR, or JBIG, and decompresses compressed data into raster image data. The codec 119 is connected to an SRAM 120, which is used by the codec 119 as a temporary work area. The network controller 121 is connected to the LAN 600 via a connector 122, for carrying out predetermined control of communication with the LAN 600.

The main controller 111 is also connected to a scanner I/F 140 via a scanner bus 141, to a printer I/F 145 via a printer bus 146, and to an expansion connector 124 for connection to an expansion board and an input/output controller (I/O controller) 126 via a general-purpose high-speed bus 125 such as a PCI bus.

The I/O controller 126 includes a 2-channel asynchronous serial communication controller 127 for transmitting and receiving control commands to and from the reader unit 200 and the printer unit 300. The serial communication controller 127 is connected to the scanner I/F 140 and the printer I/F 145 via an I/O bus 128.

The scanner I/F 140 is connected to a scanner connector 142 via a first asynchronous serial I/F 143 and a first video I/F 144. The scanner connector 142 is connected to the scanner unit 210 of the reader unit 200. The scanner I/F 140 performs binarization and scaling up/down in the main scanning direction and/or in the sub-scanning direction on image data received from the scanner unit 210, produces a control signal based on a video signal received from the scanner unit 210, and transfers the resultant image data and control signal to the main controller 111 via the scanner bus 141.

The printer I/F 145 is connected to a printer connector 147 via a second asynchronous serial I/F 148 and a second video I/F 149. The printer connector 147 is connected to the marking unit 320 of the printer unit 300. The printer I/F 145 performs smoothing on image data output from the main controller 111 and outputs the resultant image data to the marking unit 320. The printer I/F 145 also outputs a control signal produced based on a video signal received from the marking unit 320 to the printer bus 146.

The CPU 112 operates in accordance with control programs loaded from the ROM 114 via the ROM I/F 115. For example, the CPU 112 interprets PDL (page description language) data received from the PC 601 or 602 and expands the received PDL data into raster image data.

The bus controller 113 controls the transfer of data that is input from and output to external apparatuses connected to the scanner I/F 140, the printer I/F 145, the expansion connector 124, etc. More specifically, the bus controller 113 performs arbitration when there is a bus conflict and controls DMA data transfer. For example, the data transfer between the DRAM 116 and the codec 119, the data transfer from the scanner unit 210 to the DRAM 116, and the data transfer from the DRAM 116 to the marking unit 320 described above are carried out under the control of the bus controller 113.

The I/O controller 126 is connected to a panel I/F 132 via an LCD controller 131 and a key input I/F 130. The panel I/F 132 is connected to the operating unit 150. The I/O controller 126 is connected to an EEPROM 135 that is a non-volatile memory, to the image storage unit (HDD) 160 to and from which image data can be written and read out via an E-IDE connector 161, and to a real-time clock module 133 that updates/stores date and time managed in the digital multifunction peripheral. The real-time clock module 133 is connected to and backed up by a backup battery 134.

Figure 4:
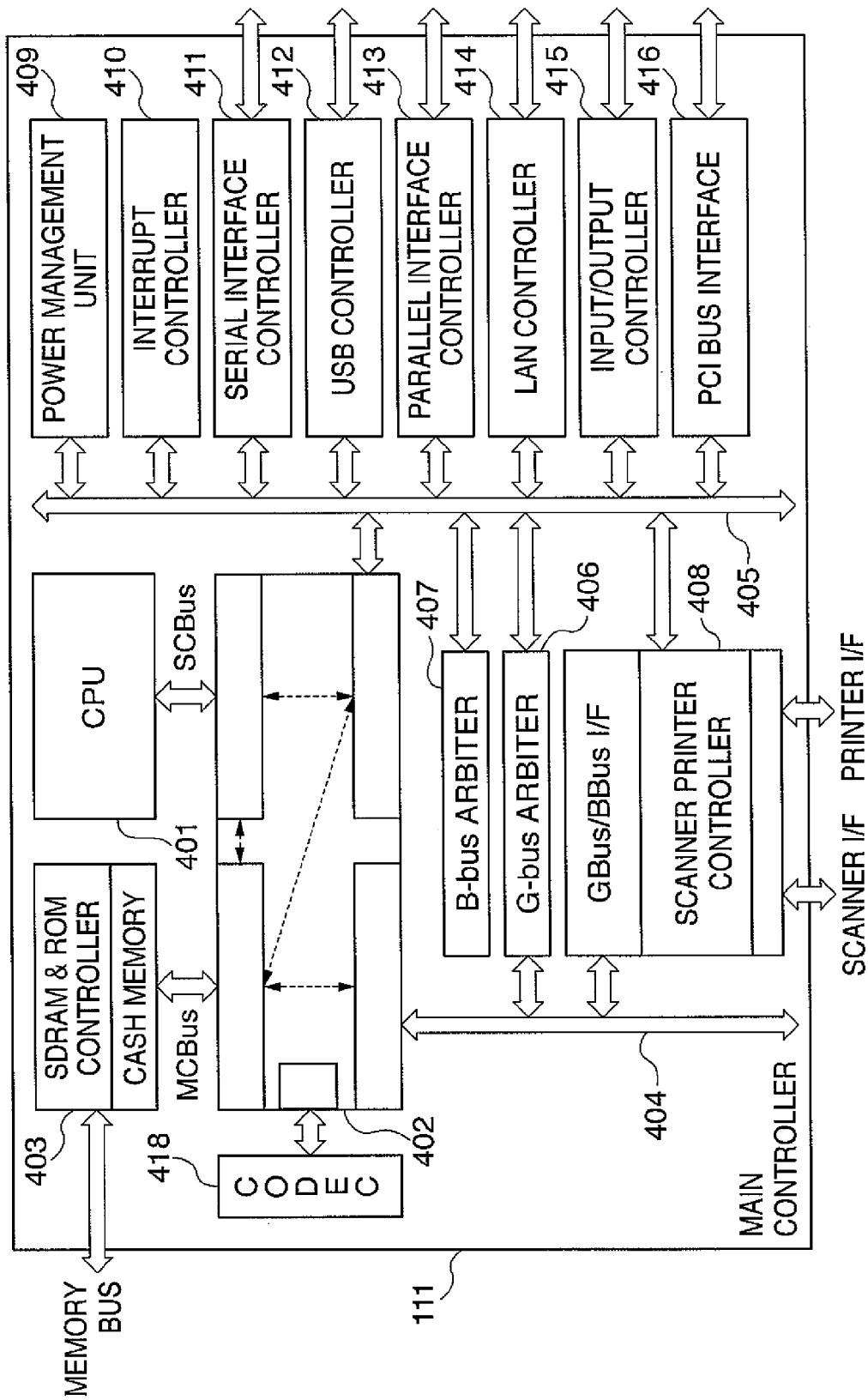
FIG. 4 is a block diagram showing the internal construction of a main controller shown in FIG. 3.

Referring next to FIG. 4, a detailed description will be given of the main controller 111. FIG. 4 is a block diagram showing the internal construction of the main controller 111 appearing in FIG. 3.

As shown in FIG. 4, the main controller 111 includes a processor core 401 constituting the CPU 112. The processor core 401 is connected to a system bus bridge (SBB) 402 via a 64-bit processor bus (SC-bus). The SBB 402 is a 4×4 64-bit crossbar switch connected to a total of four buses, i.e., the SC-bus for connection with the processor core 401, a local bus (MC-bus) dedicated to connection with a memory controller 403 that is provided with a cash memory and controls an SDRAM or a ROM, a graphic bus (G-bus) 404, and an IO bus (B-bus) 405. The SBB 402 is designed to ensure simultaneous parallel connection between the four modules as far as possible. The SBB 402 is also connected to a data compression/expansion unit (CODEC) 418 via a CODEC I/F.

The G-bus 404 is cooperatively controlled by a G-bus arbiter (GBA) 406, and is connected to a scanner/printer controller (SPC) 408 for connection with a scanner or a printer. The B-bus 405 is cooperatively controlled by a B-bus arbiter (BBA) 407, and is connected to a power management unit (PMU) 409, an interrupt controller (IC) 410, a serial interface controller (SIC) 411 using a UART, a USB controller 412, an IEEE 1284 parallel interface controller (PIC) 413, an Ethernet (registered trademark) LAN controller (LANC) 414, a general-purpose input/output controller (MISC) 415, and a PCI bus interface (PCIC) 416, as well as the SPC 408.

The B-bus arbiter 407 carries out arbitration to cooperatively control the B-bus 405. If the B-bus arbiter 407 receives a request to use the B-bus 405, the B-bus arbiter 407 carries out arbitration such that one selected master is enabled to use the B-bus 405. This prevents the B-bus 405 from being accessed by two or more masters at the same time. For the purpose of arbitration, three priority levels are defined, and each master is assigned one of those three priority levels.

The interrupt controller 410 collects interrupts from outside the above described various functional blocks and the controller 110 and redistributes them to the controllers 408 and 411 to 416 that are supported by the processor core 401 and nonmaskable interrupts (NMI).

The power management unit 409 manages electric power with respect to each functional block and monitors the power consumption of the controller 110. Specifically, the controller 110 is comprised of a large-scale ASIC (application specific integrated circuit) having the processor core 401 incorporated therein. For this reason, if all the functional blocks in the controller 110 operate at the same time, a large amount of heat is generated, which may break the controller 110. To obviate this, the power management unit 409 performs power management on a block-by-block basis, and gathers power consumptions of respective functional blocks as power management levels. The power management unit 409 adds the power consumptions together to calculate a total power consumption, and controls the power consumption of each functional block so that the total power consumption can be kept lower than the maximum allowable value.

The G-bus arbiter 406 cooperatively controls the G-bus 404 by means of a centralized arbitration, and uses request signals and enable signals that are uniquely defined for the respective bus masters. Priorities are assigned to the respective masters selectively in either of the following modes: an equal arbitration mode in which priority is equally assigned to all the bus masters, and a priority arbitration mode in which, of various bus masters, a particular bus master is assigned a high priority.

Figure 5:
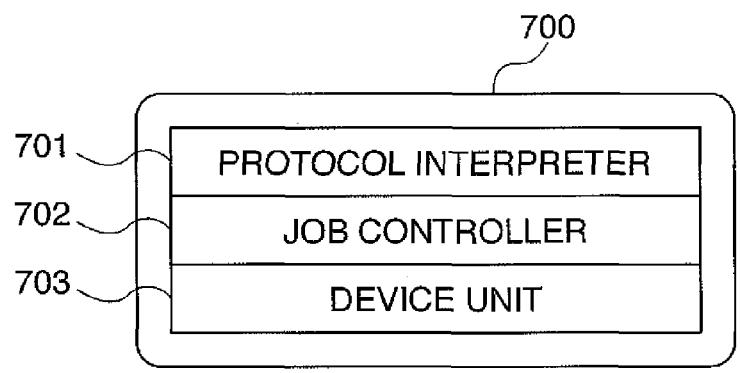
FIG. 5 is a block diagram showing the internal software construction of the controller in FIG. 1.
Figure 6:
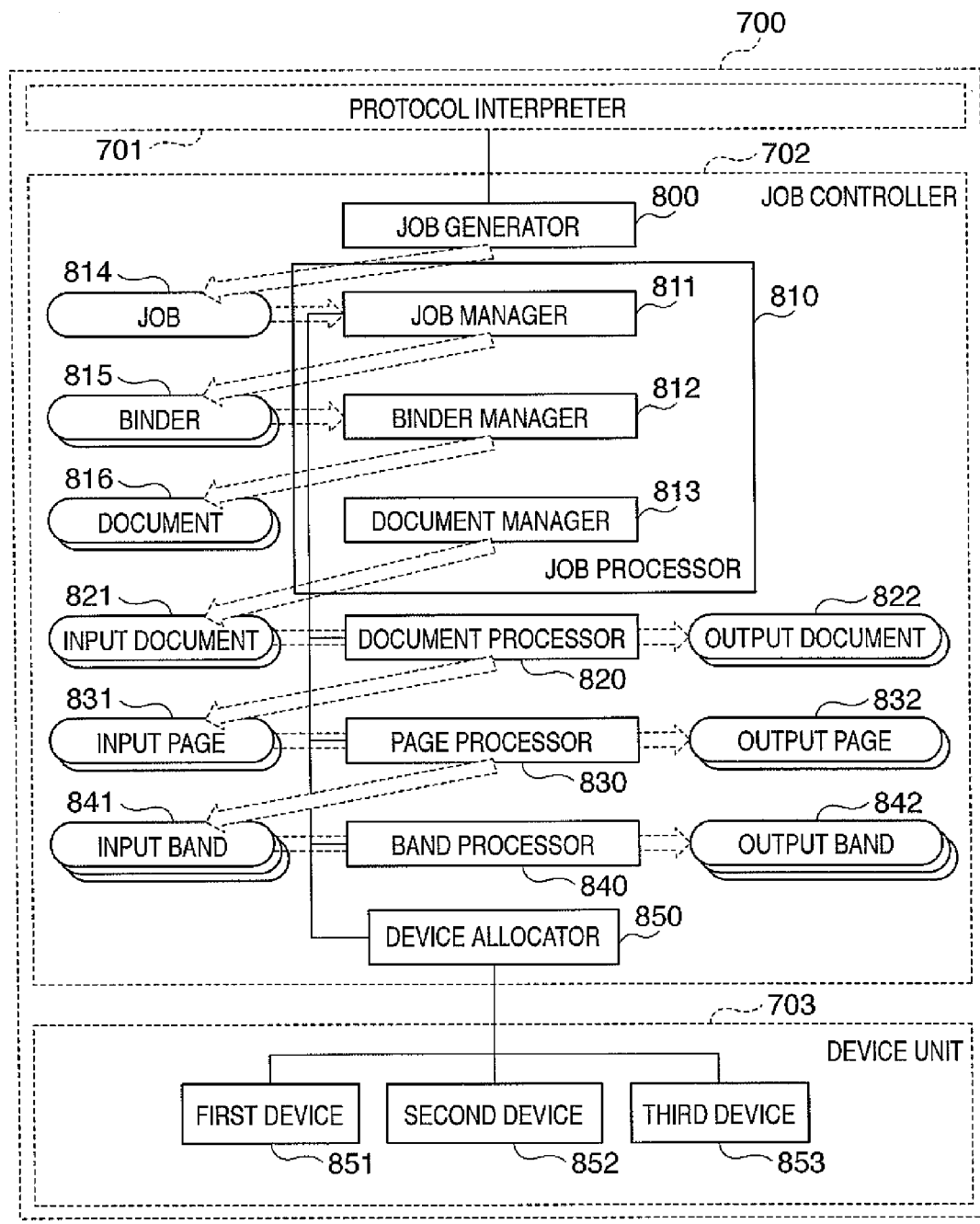
FIG. 6 is a block diagram showing the construction of a job controller and a device unit shown in FIG. 5.

Referring next to FIGS. 5 and 6, a description will be given of the internal software configuration of the controller 110. FIG. 5 is a block diagram showing the internal software configuration of the controller 110 in FIG. 1, and FIG. 6 is a block diagram showing a job controller and a device unit in FIG. 5.

As shown in FIG. 5, the controller 110 is comprised of a protocol interpreter 701, a job controller 702, and a device unit 703, which are implemented by controller software 700. The protocol interpreter 701 interprets a command (protocol) received from any of the PCs 601, 602 or the operating unit 150 via a corresponding one of the interfaces 411 to 414, and requests the job controller 702 to perform a job. The job controller 702 performs various jobs in accordance with requests from the job controller 701. The device unit 703 includes driver software for controlling the device units constituting the digital multifunction peripheral 100. The driver software is used by the job controller 702 in performing a job.

As shown in FIG. 6, the job controller 702 includes a job generator 800, a job processor 810, a document processor 820, a page processor 830, a band processor 840, and a device allocator 850. The job processor 810 includes a job manager 811, a binder manager 812, and a document manager 813. The device unit 703 includes a plurality of devices such as a first device 851, a second device 852, and a third device 853.

A series of requests for operations from the PC 601, 602 or the operating unit 150 are input in the form of a command (protocol) to the protocol interpreter 701 via a corresponding one of the interfaces 411 to 414. The input command is interpreted by the protocol interpreter 701 and then supplied to the job generator 800 of the job controller 702. On this occasion, the command is converted into a form that can be understood by the job controller 702.

In accordance with the command interpreted by the protocol interpreter 701, the job generator 800 generates a job 814. Examples of the job 814 include a copy job, a print job, a scan job, and a facsimile job. Examples of the protocol interpreted by the protocol interpreter 701 include various setting information indicative of the name of a document to be printed, the number of copies, and the sheet discharge tray to which the printed sheets are to be discharged, as well as print data (PDL data). The generated job 814 is sent to the job processor 810, which processes the received job 814.

The job processor 810 includes a job manager 811, a binder manager 812, and a document manager 813, and is adapted for making settings and processing associated with the entirety of the job 814. The job manager 811 makes settings associated with the entirety of the job 814 such as the order in which a plurality of binders 815 constituting the job 814 are output. The binder manager 812 makes settings associated with the entirety of the binder 815 such as the order in which a plurality of documents 816 constituting the binder 815 are output. The document manager 813 makes settings associated with the entirety of the document 816 such as the order in which a plurality of pages 831 constituting the document 816 are output.

In addition to making the settings and processing associated with the entirety of the job 814, the job processor 810 performs processing of dividing the job 814 into the binders 815 which are smaller portions constituting the job 814, and dividing each binder 815 into the documents 816 that are smaller portions constituting the binder 815.

Each document 816 is related to a corresponding input document 821 on a one-to-one basis. The document processor 820 converts each input document 821 into an output document 822. For example, in the case of a scan job, a set of originals is read by the reader unit 200 and a plurality of images that have been read are converted into respective pieces of image data. The input document 821 includes written data indicative of the settings associated with the set of the originals and operational procedures to be performed. The output document 822 includes written data indicative of the setting associated with the set of the image data and operational procedures to be performed. The document processor 820 serves to convert a plurality of images read from a set of originals into respective pieces of image data.

The document processor 820 converts the input documents 821 into the output documents 822 on a document-by-document basis. In addition to making the settings associated with the entire document, the document processor 820 divides the document into a plurality of still smaller portions called input pages 831, and requests the page processor 830 to process the pages 831. This is similar to dividing of a job into binders 815 and further into documents 816 when the job processor 810 processes each job. A specific example of document-level setting/processing is setting/processing associated with the order of pages such as sorting of pages, selection of double-sided printing, addition of a cover page, and OHP insertion.

The page processor 830 converts each input page 831 into an output page 832. For example, in the case of the scan job described above, each input page 831 includes written data indicative of setting/procedure such as the reading resolution and the reading direction (landscape or portrait), whereas each output page 832 includes written data indicative of setting/procedure such as the storage location where the image data is to be stored.

In the case where a job is divided into smaller and smaller portions finally into pages as described above, the system has a page memory having a storage capacity of one page, resulting in an increase in costs, but it is unnecessary to further divide each page into smaller portions. In actuality, however, when the system cannot have a page memory having a storage capacity of one page in view of, for example, costs of the memory, the job 814 is processed using a memory (band memory) having a small storage capacity of a few lines. In this case, each page is further divided into a plurality of portions called bands. More specifically, the band processor 840 converts each input band 841 into an output band 842 in a manner similar to the manner in which each page is processed.

When the job processor 810, the document processor 820, the page processor 830, and the band processor 840 perform processing, they use various physical devices in the image input/output system 100. It is a matter of course that, if a plurality of these processors operate at the same time, competition occurs in terms of usage of the various physical devices. The device allocator 850 arbitrates the use of the devices. The first to third devices 851 to 853 illustrated for example are logical devices allocated to the above processors by the device allocator 850. Examples of such devices include a page memory, a band memory, the original feeding unit 250, the marking unit 320, and the scanner unit 210.

Figure 7:
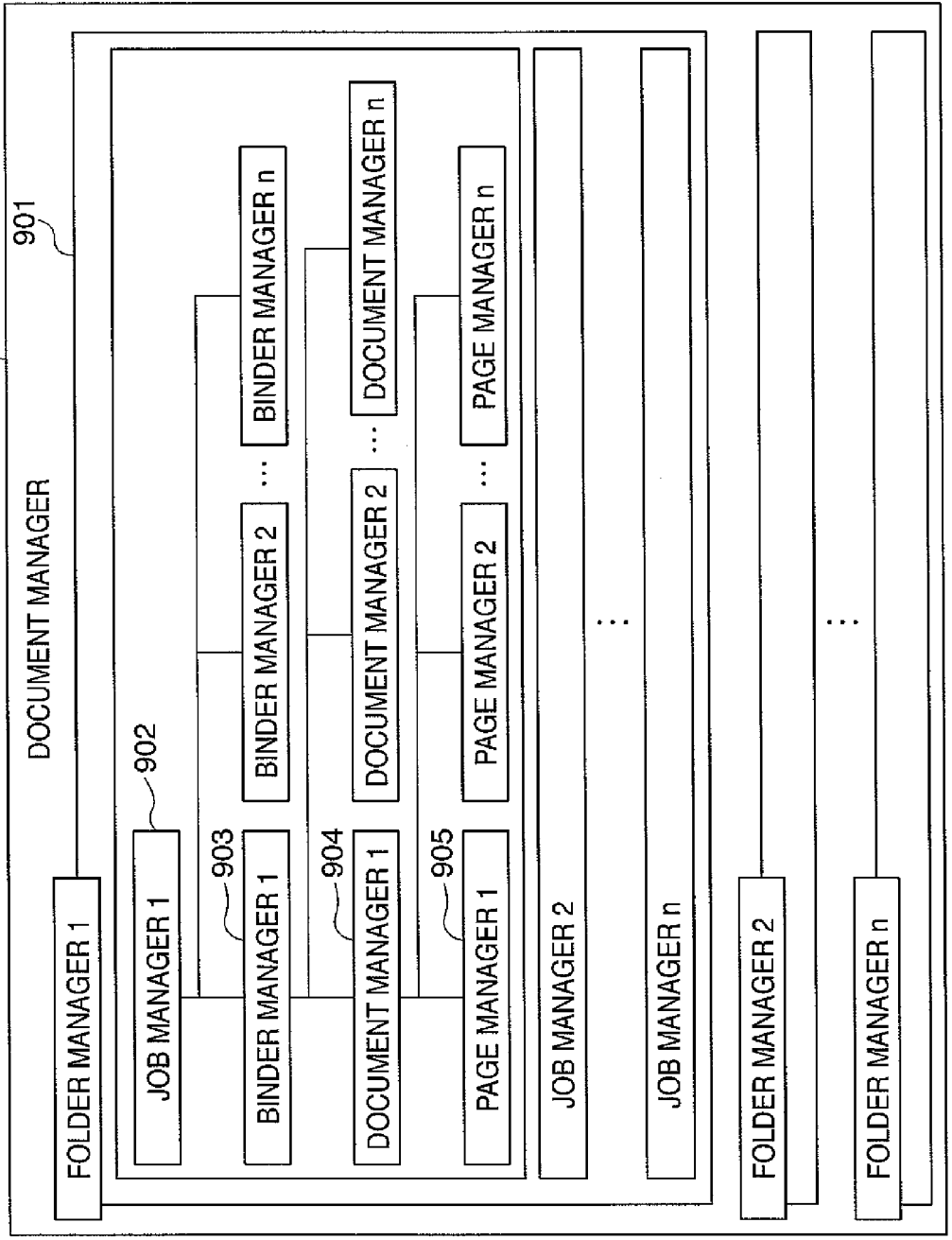
FIG. 7 is a diagram showing the management system configuration of a document manager that manages image data stored in an image storage unit in FIG. 1.

Referring next to FIG. 7, a description will be given of a document manager 900 that manages image data stored in the image storage unit 160. FIG. 7 is a diagram showing the management system configuration of the document manager that manages image data stored in the image storage unit in FIG. 1.

As shown in FIG. 7, the document manager 900 is comprised of folder managers 901, job managers 902, binder managers 903, document managers 904, and page managers 905, each of which has its own management information (attribute value). Specifically, the document manager 900 is comprised of one or more folder managers 901 and stores management information associated with the one or more folder managers 901. Each folder manager 901 is comprised of one or more job managers 902 and stores management information associated with the one or more job managers 902. Each job manager 902 is comprised of one or more binder managers 903 and stores management information associated with the one or more job managers 903. Also, each job manager 902 can store/save attribute information that is stored in the job manager 811 and required in processing the job 814 by the job controller 702. Each binder manager 903 is comprised of one or more document managers 904 and stores management information associated with the one or more document managers 904. Also, each binder manager 903 can store/save attribute information that is stored in the binder manager 812 and required in processing the binder 815 by the job controller 702.

Each document manager 904 is comprised of one or more page managers 905 and stores management information associated with the one or more page managers 905. Also, each document manager 904 can store/save attribute information that is stored in the document manager 813 and required for processing on the document by the job controller 702 and also store attribute information associated with the output document 822 processed by the document processor 820. The page manager 905 is made correspond to image data of one page that has been read by the reader unit 200, image data of one page that has been obtained by expanding PDL transmitted from the host computer 601 or 602, image data of one page received by a FAX board, or the like. Each page manager 905 can store attribute information associated with an output page 832 processed by the page processor 830 of the job controller 702. Thus, it is possible to reproduce the job 814, which has been inputted at the time of image storage, from information stored in the document manager 900 and image data stored in the image storage unit 160. It is also possible to perform the job in a manner different from that specified at the time of the job being inputted, by resetting the stored information.

Figure 8A:
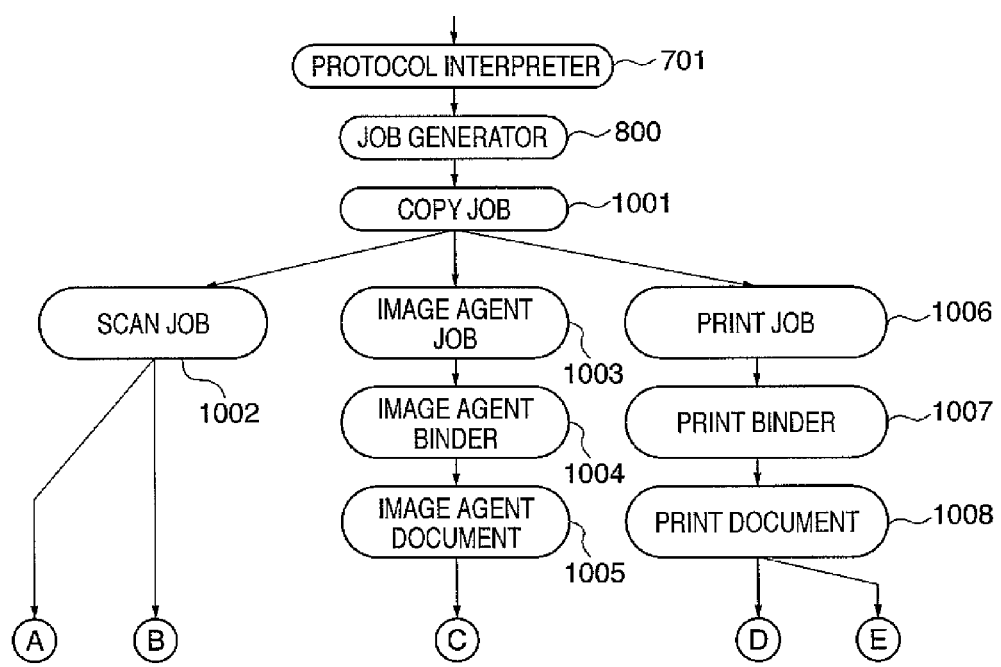
FIGS. 8A and 8B are a diagram showing an example of the construction of a copy job performed by the controller in FIG. 1.
Figure 8B:
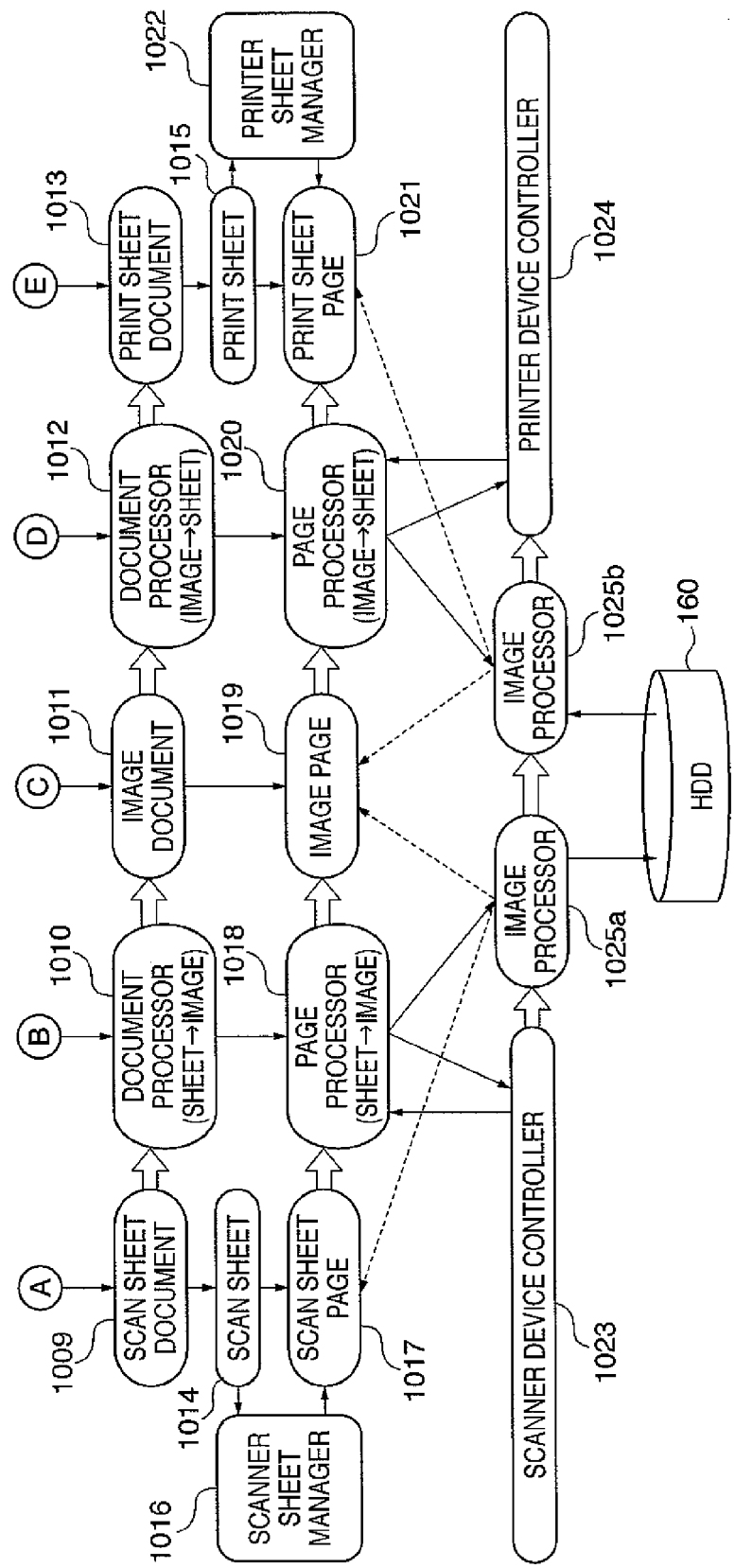

Referring next to FIGS. 8A and 8B, a description will be given of a copy job, which is one of jobs 814 performed by the controller 110. FIGS. 8A and 8B are a diagram showing an example of a copy job performed by the controller in FIG. 1.

When receiving a series of requests for operations in the form of a command for performing a copy job from the host computer 601 or 602 or from the operating unit 150, the protocol interpreter 701 interprets the received command, converts the interpreted command into a form that can be understood by the job generator 800, and sends the resulting command to the job generator 800 as shown in FIGS. 8A and 8B. The job generator 800 generates a copy job 1001 in accordance with the received command. The copy job 1001 has a function of carrying out a copying process. The copy job 1001 thereby generates a scan job 1002, an image agent job 1003, and a print job 1006, and realizes the copying process by controlling operations associated with those produced jobs. The image agent job 1003 requests image agent binders 1004 to perform the details of the process, and each image agent binder 1004 requests image agent documents 1005 to perform the further details of the process, and so on. The image agent job 1003 controls the agent binders 1004 each of which controls the image agent documents 1005. The image agent document 1005 produces an image document 1011, which is an output document to be output by a document processor (sheet→image) 1010. The produced image document 1011 is sent to the scan job 1002 and the print job 1006 via the image agent binder 1004, the image agent job 1003, and the copy job 1001.

The scan job 1002 produces a scan sheet document 1009, which is an input document to be input to the document processor (sheet→image) 1010. Thereafter, it produces the document processor (sheet→image) 1010. At this time, the document processor (sheet→image) 1010 is informed that the scan sheet document 1009 is specified as the input document and the image document 1011 is specified as the output document. Thereafter, the scan job 1002 requests the document processor (sheet→image) 1010 to perform processing on the scan sheet document 1009 and controls the operation of the document processor (sheet→image) 1010. In the scan job 1002, the job processor 810 performs setting/processing associated with the entirety of the scan job 1002 and also performs setting/processing associated with binders. In the scan job 1002, the physical structures of the scanner unit 210 and the scanner original unit 250 allow one scanning operation to be controlled by means of one job, one binder, and one document. Thus, in the present embodiment, the binder 815 and the document 816 are omitted.

In the scan sheet document 1009, information associated with an original is managed in the form of attribute information, and in the image document 1011, information associated with image data obtained by reading is managed in the form of attribute information. Based upon the attribute information, the document processor (sheet→image) 1010 controls the process of converting the scan sheet document 1009 given as the input document into the image document 1011 specified as the output document. The document processor (sheet→image) 1010 performs only processing on a document-by-document basis, and details of the processing are performed by a scan sheet page 1017, a page processor (sheet→image) 1018, and an image page 1019. The scan sheet document 1009 sequentially produces scan sheets 1014 corresponding in number to the number of originals. When a scan sheet 1014 is produced, an identifier thereof is registered in a scanner sheet manager 1016 that manages the order in which originals are processed. Thereafter, the scan sheet 1014 generates a scan sheet page 1017. The scan sheet page 1017 corresponds to a front-side page or a rear-side page of an original. In the case of a double-sided original, each scan sheet 1014 produces two scan sheet pages 1017.

Based on the identifier of the scan sheet 1014 and device specifications (such as the original reading order), the scanner sheet manager 1016 determines the order in which processing is performed on scan sheet pages 1017. In the scan sheet page 1017, information relating to the corresponding page of the original is managed, and in the image page 1019 produced by the image document 1011, information relating to read image data of the corresponding page is managed. The page processor (sheet→image) 1018 controls the process of converting the scan sheet page 1017 given as an input page into the image page 1019 specified as an output page. The page processor (sheet→image) 1018, which grasps a process sequence for controlling the physical scanner device, controls an original reading operation (scan operation) by issuing an engine control command prepared in advance to a scanner device controller 1023. Also, the attribute information managed in the scan sheet page 1017 and the image page 1019 is set in an image processor 1025*a*, which is then controlled, so that the read original is stored as image data in the image storage unit 160.

The document manger 900 manages the stored image data. The stored image data can be, for example, read, copied, moved, and deleted via the document manager 900. The image processors 1025*a* and 1025*b* include control associated with resolution conversion, code conversion, etc.

On the other hand, the print job 1006 performs setting/processing associated with the entire print job, and divides itself into print binders 1007 as a plurality of portions. Each of the print binders divides itself into print documents 1008 as a plurality of still smaller portions, and performs setting/processing associated with the entire print processing. The print document 1008 produces a print sheet document 1013 as an output document to be output from a document processor (image→sheet) 1012. Thereafter, it produces the document processor (image→sheet) 1012. At this time, the image document 1011 specified as the input document and the print sheet document 1013 specified as the output document are sent to the document processor (image→sheet) 1012. The print document 1008 requests the document processor (image→sheet) 1012 to perform processing and controls the operation of the same.

In the print sheet document 1013, attribute information associated with print output is managed, and in the image document 1011, attribute information associated with image data is managed. In accordance with these pieces of attribute information, the document processor (image→sheet) 1012 controls the process of converting the image document 1011 given as the input document into the print sheet document 1013 specified as the output document. The document processor (image→sheet) 1012 performs only processing associated with the document as a whole, and details of the processing are performed by the image page 1019, a page processor (image→sheet) 1020, and a print sheet page 1021, which handle smaller job portions.

The print sheet document 1013 sequentially produces print sheets 1015 corresponding in number to the number of pages to be printed. When each print sheet 1015 is produced, the print sheet 1015 registers its identifier in a print sheet manager 1022 that controls the order of printing, and the print sheet 1015 produces a print sheet page 1021. The print sheet page 1021 corresponds to a front-side page or a rear-side page of an output sheet. In the case of double-sided printing, each print sheet 1015 produces two print sheet pages 1021. The print sheet manager 1022 determines the order in which the print sheet pages 1021 are processed based upon the identifiers of the print sheets 1015 and the specifications (such as the number of sheets internally circulated, and the order in which sheets are processed in double-sided output) of the device.

In each print sheet page 1021, information associated with the page to be printed is managed, and in the image page 1019, information associated with image data of the page is managed. The page processor (image→sheet) 1020 controls the process of converting the image page 1019 given as the input page into the print sheet page 1021 specified as the output page. The page processor (image→sheet) 1020, which grasps the process sequence performed by the physical printer device, controls the printing operation by issuing an engine control command prepared in advance to a printer device controller 1024. Also, the attribute information managed in the image page 1019 and the print sheet page 1021 is set in the image processor 1025*b*, which is then controlled, so that the image data stored in the image storage unit 160 are printed on printing sheets.

The copying operation is accomplished by the above described series of operations in which the job is divided into smaller and smaller portions and processed by the corresponding processors.

Figure 9:
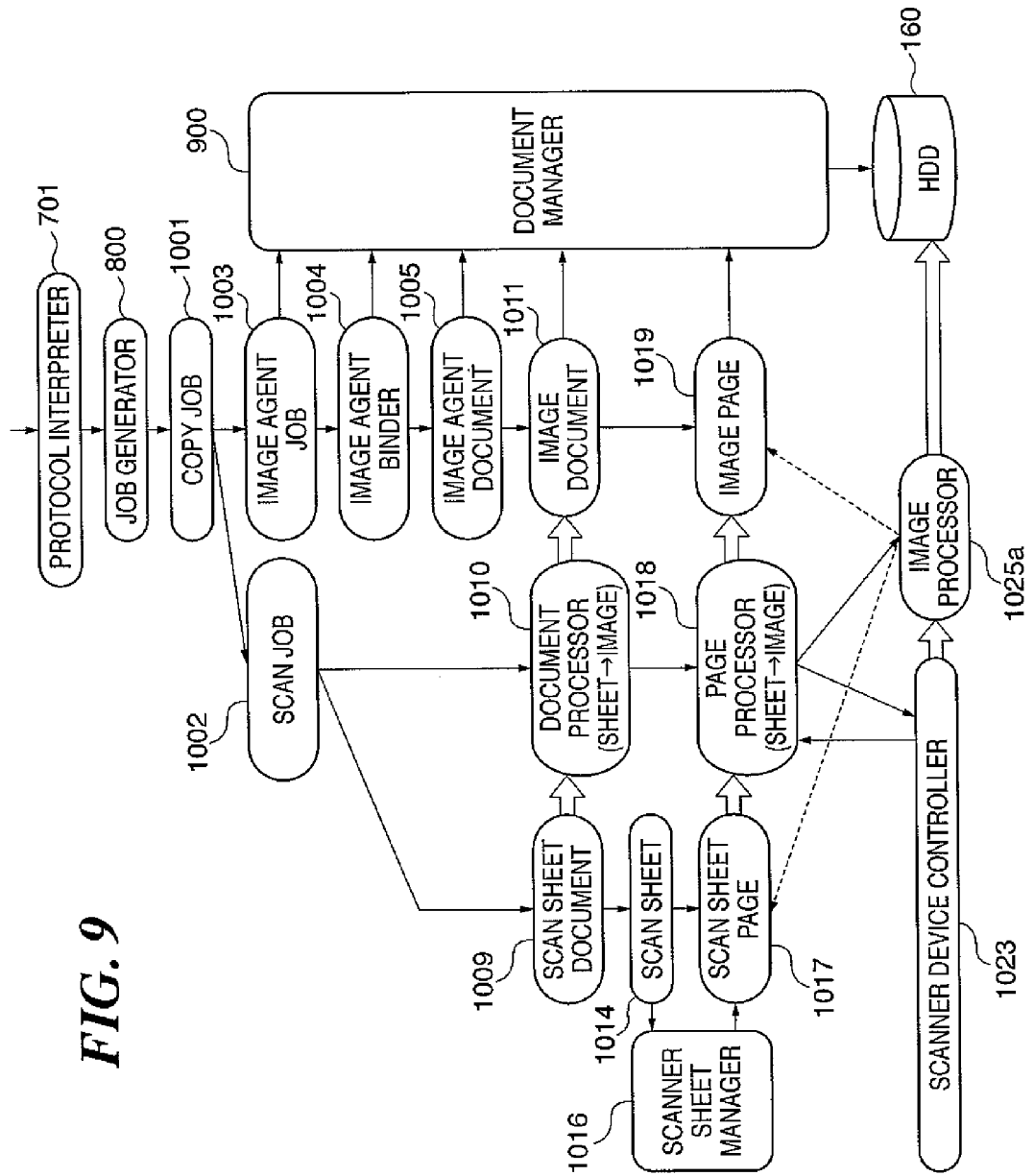
FIG. 9 is a diagram showing an example of manner in which attribute information is stored in a document manager when a copy job is performed.

Referring next to FIG. 9, a description will be given of an example in which attribute information is stored in the document manager 900 when a copy job is performed, which is not shown in FIGS. 5A and 8B. FIG. 9 is a diagram showing an example of a manner in which attribute information is stored in the document manager 900 when a copy job is performed.

As descried above with reference to FIG. 7, the document manager 900 includes the folder managers 901, the job managers 902, the binder managers 903, the document managers 904, and the page managers 905, each of which has its own management information (attribute value). The attribute information, which is stored in the job manager 811 and required in processing the job 814 by the job controller 702, is stored/saved in the job manager 902 of the document manager 900 by the image agent job 1003. The attribute information, which is stored in the binder manager 812 and required in processing the job 815 by the job controller 702, is stored/saved in the binder manager 903 of the document manager 900 by the image agent binder 1004. The attribute information, which is stored in the document manager 813 and required in processing the job controller 702, and the attribute information associated with the output document 822 processed by the document processor 820 are stored/saved in the document manager 904 of the document manager 900 by the image document 1011 corresponding to the output document. The attribute information associated with the output page 832 processed by the page processor 830 of the job controller 702 is stored/saved in the page manager 905 of the document manager 900 by the image page 1019 corresponding to the output page.

Figure 10:
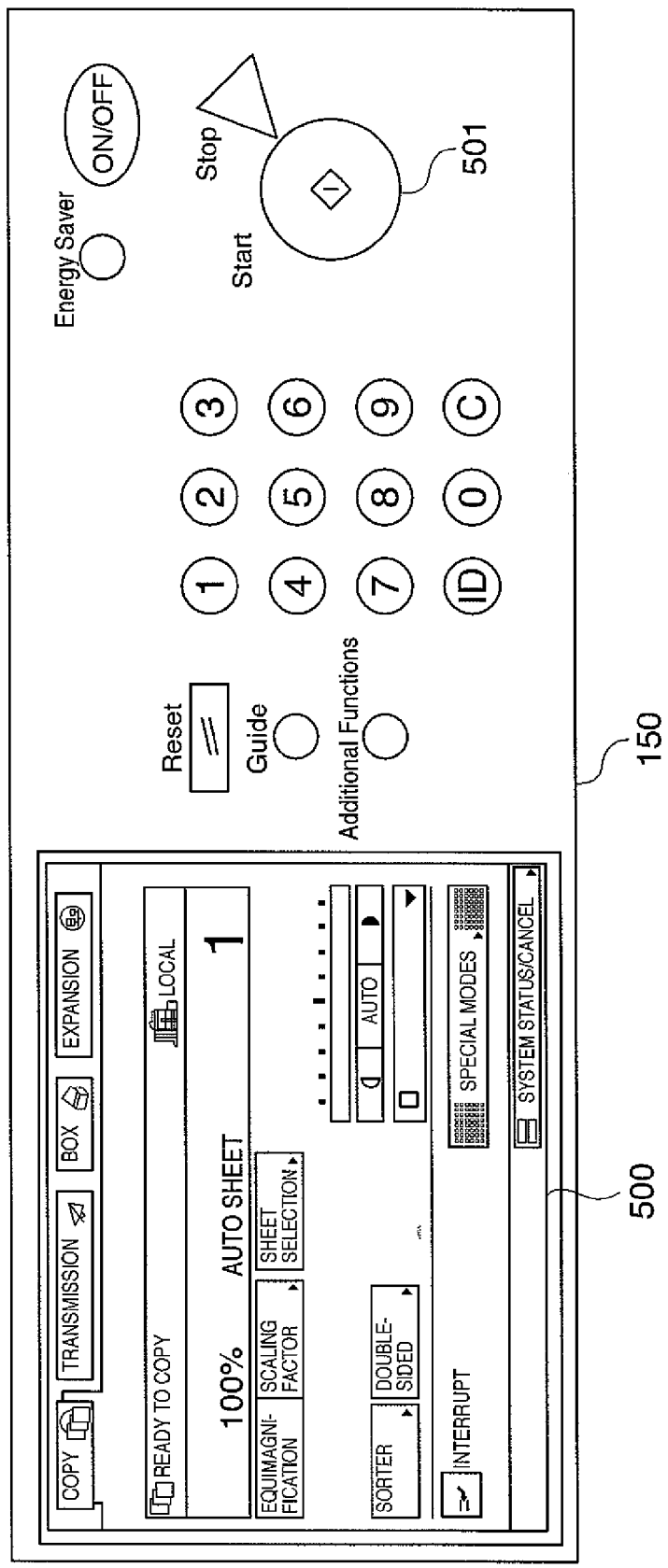
FIG. 10 is a diagram showing the appearance of an operating unit in FIG. 1.
Figure 11:
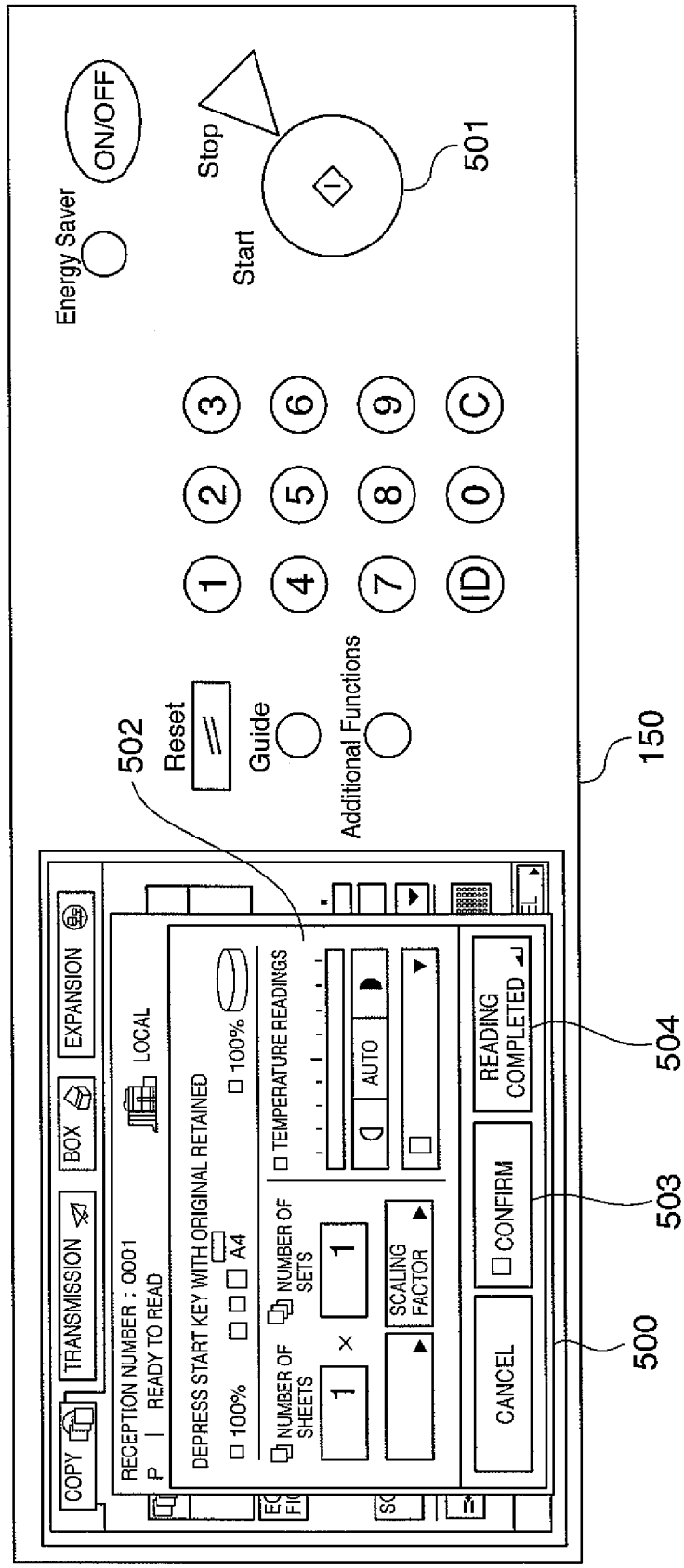
FIG. 11 is a diagram showing an example of an original reading setup screen displayed on the operating unit.

Referring next to FIGS. 10 to 12, a description will be given of the construction of the operating unit 150 appearing in FIG. 1. FIG. 10 is a diagram showing the appearance of the operating unit 150, FIG. 11 is a diagram showing an example of an original reading setup screen displayed on the operating unit 150, and FIG. 12 is a diagram showing an example of an original reading confirmation screen displayed on the operating unit 150.

As shown in FIG. 10, the operating unit 150 includes a liquid crystal display panel 500 with a touch panel that provides a user interface screen, and various hard keys including a start button 501. Via the user interface screen provided by the liquid crystal display panel 500, a user can set various copying modes (e.g., double-sided copying setting, grouping, sorting, and stapling). It should be noted that the copying modes may be set using either soft keys displayed on the touch panel or hard keys.

When the start button 501 is depressed, a copying process is started. If a "sequential reading mode" in which reading of originals and storage of read images are repeatedly carried out is selected as a copying mode, an original reading setup screen 502 in FIG. 11 is displayed on the liquid crystal display panel 500. On the original reading setup screen 502, there are displayed a "confirm" button 503 for entering a mode in which images that have been read up to the present are displayed, and a "reading completed" button 504 for collectively outputting all the images that have been read up to the present are displayed.

When the "confirm" button 503 is depressed on the original reading setup screen 502, a read image confirmation screen 513 in FIG. 12 is displayed on the liquid crystal display panel 500. On the read image confirmation screen 513 are displayed a display field 505 where the total number of pages of images that have been stored up to the present and the page number of the page being currently displayed, page shift buttons 506 and 507 for shifting the page of image stored, a zoom out button 508 and a zoom in button 509 for zooming out and in a preview image, a stored image confirmation screen 510 on which the contents of the page being displayed in the display field 505 are displayed, a "re-read" button 511 for closing the read image confirmation screen 513, and a "close" button 512 for closing the read image confirmation screen 513.

When the page shift button 506 is depressed, the page being currently displayed is switched to a previous page, and when the page shift button 507 is depressed, the page being currently displayed is switched to a next page. When the zoom out button 508 is depressed, the preview image is zoomed out, and when the zoom in button 509 is depressed, the preview image is zoomed in. When the "re-read" button 511 is depressed, the page being currently displayed is stored, and the read image confirmation screen 513 is closed. When the read image confirmation screen 513 is closed, the original reading setup screen 502 appears again, making it possible to read an original. In this case, reading is performed in the re-read mode. Similarly, when the read image confirmation screen 513 is closed by depressing the "close" button 512, the original reading setup screen 502 appears again, making it possible to read an image. In this case, however, reading of an original is performed in the sequential reading mode.

In the sequential reading mode mentioned above, if one or more read images are stored, the obtained image data is stored at a location after the end of the existing image data. All the image data stored during the process is dealt with as a single set of image data. On the other hand, in the re-read mode, particular image data of stored image data is replaced with newly read image data. In either mode, an instruction for reading an original is issued by depressing the start button 501.

Figure 13A:
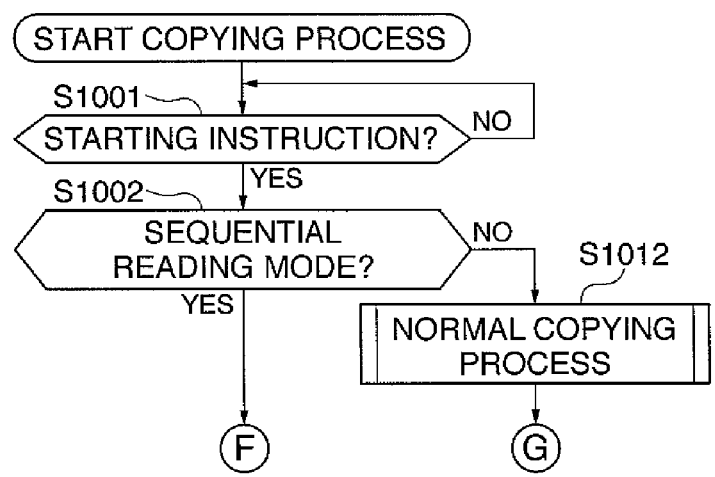

Referring next to FIGS. 13A and 13B, a description will be given of a sequential reading copying process. FIGS. 13A and 13B are a flowchart showing the procedure of the sequential-reading/copying process. The procedure in the flowchart of FIGS. 13A and 13B is carried out under the control of the controller 110 (the CPU 112).

As shown in FIGS. 13A and 13B, first, in a step S1001, the controller 110 determines whether or not a starting instruction has been issued by depressing the start button 501. If a starting instruction has been issued by depressing the start button 501, it is determined in a step S1002 whether or not the "sequential reading mode" is set. If the "sequential reading mode" is not set, the controller 110 performs copying in the normal mode in a step S1012 and terminates the process. On the other hand, if the "sequential reading mode" is set, an original reading process for reading a set of originals in the original feeding unit 250 or an original placed on the platen glass 211 is carried out in a step S1003. When the original reading process is completed, it becomes possible to give an instruction through the operating unit 150.

Next, in a step S1004, the controller 110 determines whether or not an instruction for carrying out a previewing process in which images stored in the image storage unit 160 are displayed has been issued. If the instruction for carrying out the previewing process has been given, the process proceeds to a step S1005 wherein the controller 110 carries out the previewing process. The process then proceeds to a step S1006. On the other hand, if the instruction for carrying out the previewing process has not been issued, the process proceeds to the step S1006 with the step S1005 being skipped.

In the step S1006, the controller 110 determines whether or not a re-reading instruction has been issued. Here, the re-reading instruction is issued during the previewing process in the step S1005, and if the re-reading instruction is issued, data indicative of the storage location of a page image to be re-read is stored. If the re-reading instruction has been issued, the process proceeds to a step S1007 wherein the controller 110 carries out a process in which the image data of the page stored when re-reading was instructed is discarded (deleted). The process then returns to the step S1003 wherein the controller 110 carries out the original reading process to replace the image data of the page to be re-read with newly read image data. In the original reading process, it is possible to read all the originals set on the original feeding unit 250, to read an original placed on the platen glass 211, and to read a designated number of originals among originals set on the original feeding unit 250. In the re-reading, the number of originals to be read is set to 1.

If it is determined in the step S1006 that the re-reading instruction has not been issued, the process proceeds to a step S1008 wherein the controller 110 determines whether or not an instruction for canceling reading in the sequential reading mode has been issued. If the canceling instruction has been issued, the process proceeds to a step S1009 wherein the controller 110 discards all the image data that has been read and stored up to the present, followed by termination of the process.

If it is determined in the step S1008 that the canceling instruction has not been issued, the process proceeds to a step S1010 wherein the controller 110 determines whether or not an instruction for terminating reading has been issued. If the instruction for terminating reading has been issued, the process proceeds to a step S1011 wherein the controller 110 carries out a read image printing process in which all the image data that has been read up to the present is printed, followed by termination of the process.

If it is determined in the step S1010 that the instruction for terminating reading has not been issued, the process proceeds to a step S1013 wherein the controller 110 determines whether or not a reading instruction has been issued. If the reading instruction has been issued, the process returns to the step S1003 wherein the controller 110 carries out the original reading process. On the other hand, if the reading instruction has not been given, the process returns to the step S1004. Thus, if no instruction is input via the operating unit 150, the controller 110 waits until the image confirming instruction, the re-reading instruction, the reading canceling instruction, the reading terminating instruction, or the reading instruction is issued.

Figure 14:
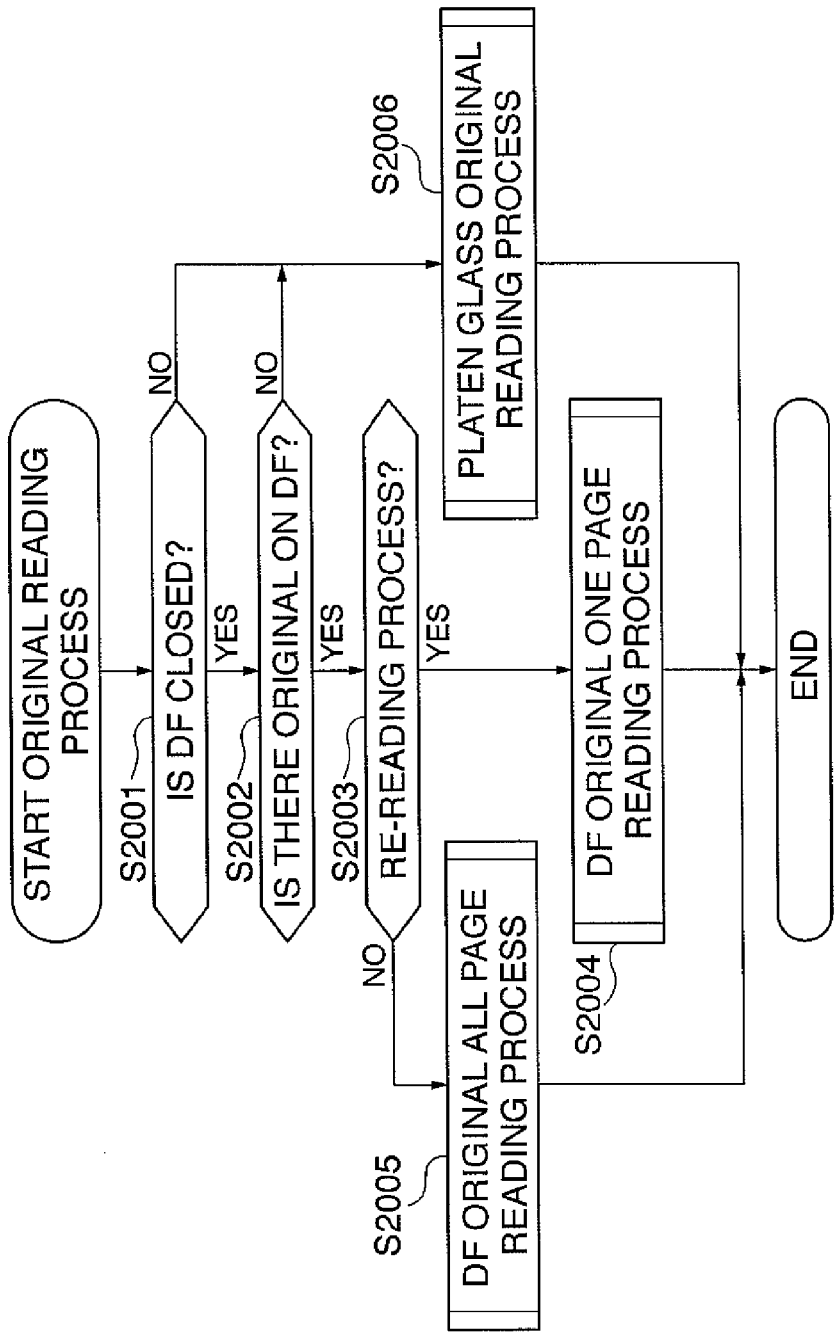
FIG. 14 is a flowchart showing the procedure of original reading process in step S1003 in FIG. 10.

Referring next to FIG. 14, a detailed description will be given of the original reading process in the step S1003 in FIG. 10. FIG. 14 is a flowchart showing the procedure of the original reading process in the step S1003.

As shown in FIG. 14, in the original reading process, first, the controller 110 determines in a step S2001 whether or not the original feeding unit (DF) 250 is closed relative to a main body of the apparatus. If the original feeding unit (DF) 250 is not closed, i.e., opened, the process proceeds to a step S2006 wherein the controller 110 carries out a process for reading originals placed on the platen glass 211 in a step S2006, followed by termination of the process.

If it is determined in the step S2001 that the original feeding unit (DF) 250 is opened, the controller 110 determines in a step S2002 whether or not a set of originals is placed on the original feeding unit (DF) 250. If a set of originals is not placed on the original feeding unit (DF) 250, the process proceeds to the step S2006 wherein the controller 110 carries out the process for reading an original placed on the platen glass 211, followed by termination of the process.

If it is determined in the step S2002 that a set of originals is placed on the original feeding unit (DF) 250, the controller 110 determines in a step S2003 whether or not the re-reading instruction has been issued. If the re-reading instruction has been issued, the process proceeds to a step S2004 wherein the controller 110 carries out a process for feeding only one original in the set of originals placed on the original feeding unit (DF) 250 and reading the fed original, followed by termination of the process.

If it is determined in the step S2003 that the re-reading instruction has not been issued, the process proceeds to a step S2005 wherein the controller 110 carries out a process for reading all the pages of the original set placed on the original feeding unit (DF) 250, followed by termination of the process.

Figure 15A:
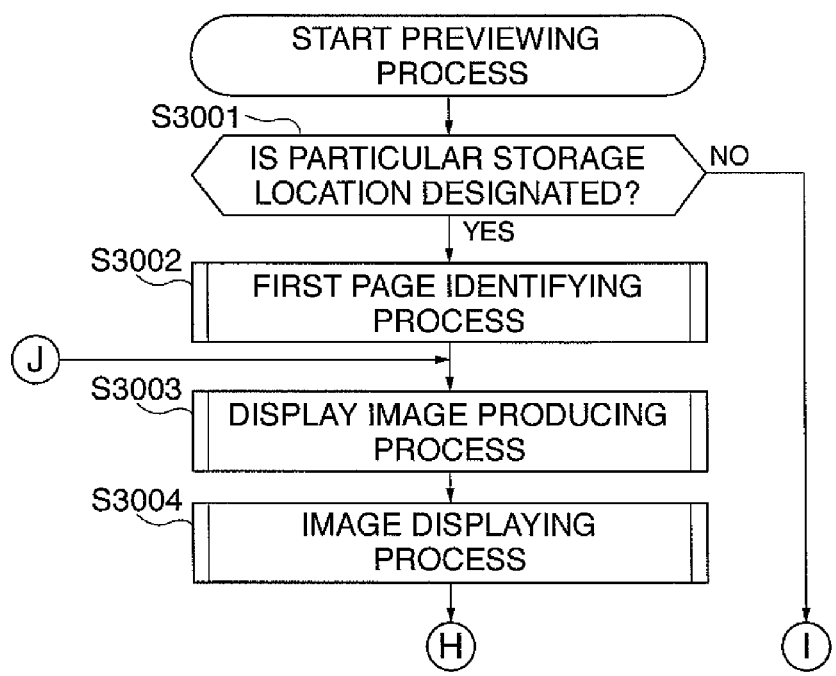
FIGS. 15A and 15B are a flowchart showing the procedure of previewing process in step S1005 in FIG. 13B.
Figure 15B:
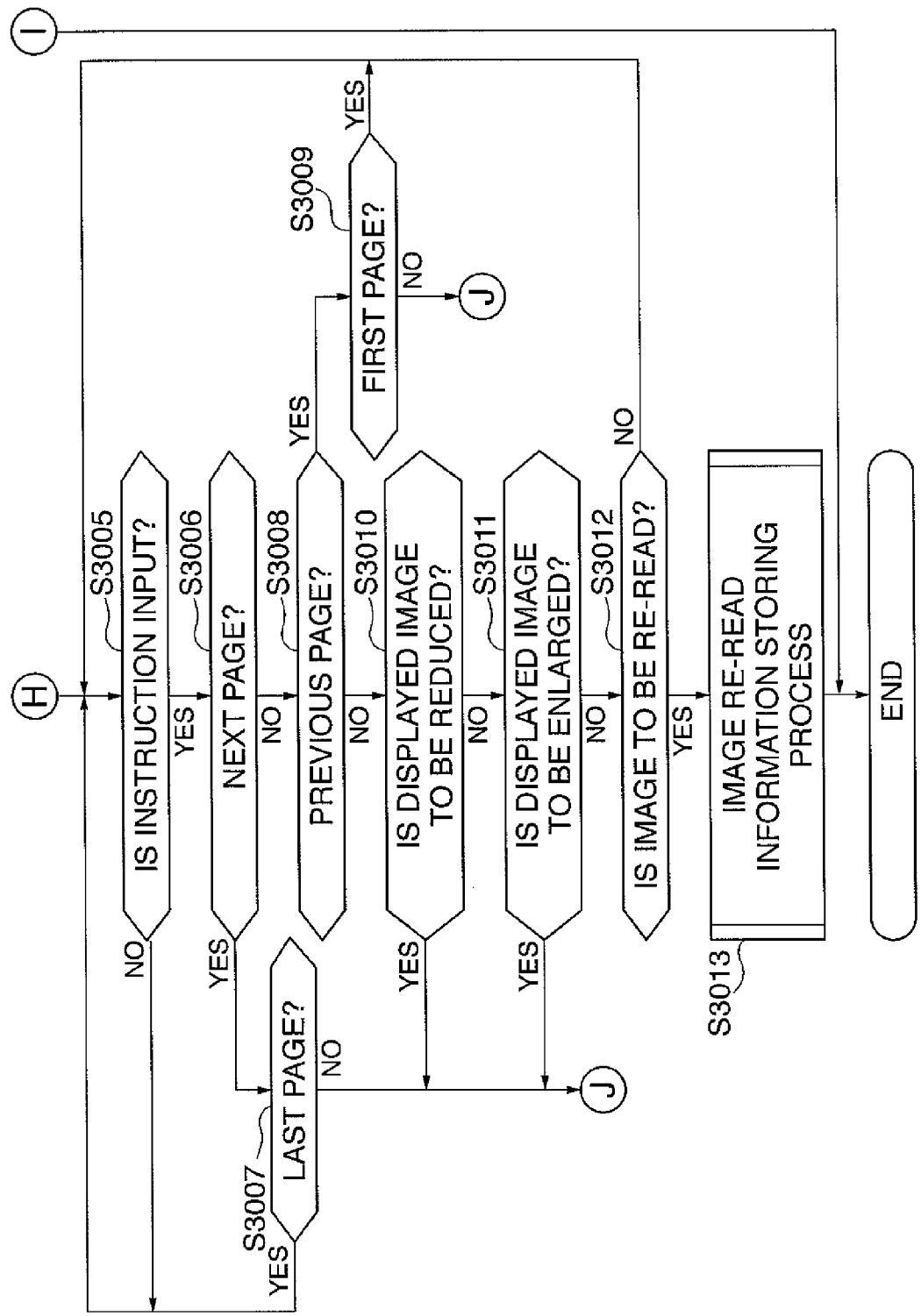

Referring next to FIGS. 15A and 15B, a detailed description will be given of the previewing process in the step S1005. FIGS. 15A and 15B are a flowchart showing the procedure of the previewing process in the step S1005 in FIG. 13B.

As shown in FIGS. 15A and 15B, in the previewing process, first, the controller 110 determines in a step S3001 whether or not a particular storage location to which image to be confirmed is stored is designated. The image data repeatedly read in the sequential reading mode is managed under the job manager 902 of the document manager 900, the copy processing being executed using the job manager 902 as image storage location. Under such management, therefore, by designating the job manager 902 as a location where image data is to be stored, it is possible to read image data read and stored until that time from the first to last pages. On the other hand, if it is determined in the step S3001 that no storage location is designated, the controller 110 terminates the process without executing any preview process.

If it is determined in step S3001 that a storage location is designated, the process proceeds to a step S3002. In the step S3002, the first page of the stored image data is identified by the controller 110. In the next step S3003, the controller 110 produces preview image data to be displayed on the stored image confirmation screen 510 (FIG. 12) from the stored image data of the first page. Although in the present embodiment, the preview image data is produced immediately before it is displayed on the stored image confirmation screen 510, the preview image data to be displayed on the stored image confirmation screen 510 may be produced when original image data is read and stored, and the produced preview image data may be stored in association with the original image data in the image storage unit 160. In the step S3004, the controller 110 displays the preview image data produced in step S3003 on the stored image confirmation screen 510.

The controller 110 then waits in a step S3005 until an instruction is input. If any instruction is input, the process proceeds to a step S3006 wherein the controller 110 determines whether or not the input instruction is an instruction for displaying the next page. If it is determined that the input instruction is the instruction for displaying the next page, the process proceeds to a step S3007 wherein the controller 110 determines whether or not the next page is the last page. If it is determined that the next page is the last page, the process returns to the step S3005. On the other hand, if it is determined that the next page is not the last page, the process returns to the step S3003.

If it is determined in the step S3006 that the input instruction is not the instruction for displaying the next page, the process proceeds to a step S3008 wherein the controller 110 determines whether or not the input instruction is an instruction for displaying the previous page. If it is determined that the input instruction is the instruction for displaying the previous page, the process proceeds to a step S3009 wherein the controller 110 determines whether or not the previous page is the first page. If it is determined that the previous page is the first page, the process returns to the step S3005. On the other hand, if it is determined that the previous page is not the first page, the process returns to step S3003.

If it is determined in the step S3008 that the input instruction is not the instruction for displaying the previous page, the process proceeds to a step S3010 wherein the controller 110 determines whether the input instruction is an instruction for zooming out the image displayed in the stored image confirmation screen 510. If so, the process returns to the step S3003 wherein the controller 110 produces scaled-down image data of the specified page, which is to be displayed on the stored image confirmation screen 510, and the controller 110 carries out the subsequent steps again.

If it is determined in the step S3010 that the input instruction is not the zoom-out instruction, the process proceeds to a step S3011. In the step S3011, it is determined whether or not the input instruction is a zoom-in instruction. If it is determined that the input instruction is the zoom-in instruction, the process returns to the step S3003 wherein the controller 110 produces scaled-up image data of the specified page, which is to be displayed on the stored image confirmation screen 510, and the controller 110 carries out the subsequent steps again.

If it is determined in the step S3011 that the input instruction is not the zoom-in instruction, the process proceeds to a step S3012 wherein the controller 110 determines whether or not the input instruction is a re-read instruction. If it is determined that the input instruction is not the re-read instruction, the process returns to the step S3005 wherein the controller 110 waits until an instruction is input. On the other hand, if it is determined that the input instruction is the re-read instruction, the process proceeds to a step S3013 wherein the controller 110 determines which location in the document manager 900 the image data corresponding to the currently displayed page is stored at, and stores identification information indicative of the location and the like. Thereafter, the controller 110 terminates the process. The identification information stored in the step S3013 is transferred to the image reading process described above, and re-reading is performed in accordance with the identification information.

Figure 16:
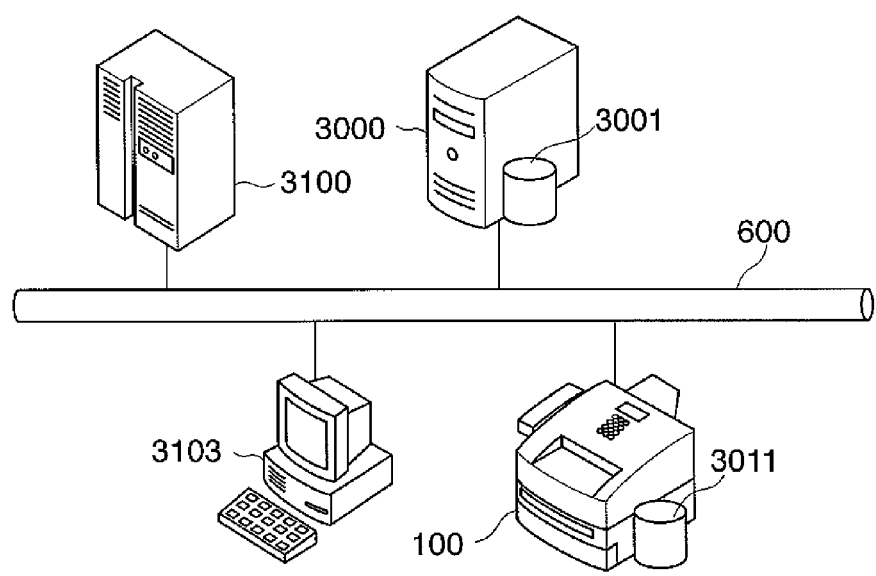
FIG. 16 is a view showing an example of the whole construction of an image processing system to which is applied an image processing apparatus shown in FIG. 1 as an image output apparatus according to the present invention.

FIG. 16 is a view showing an example of the whole construction of an image processing system to which is applied the image processing apparatus shown in FIG. 1 as an image output apparatus according to the present invention. This image processing system includes a user authentication server 3100, a document security server 3000, and a client PC 3103, which is a terminal device, as well as the above described digital multifunction peripheral 100. They are connected to one another via a LAN 600 as a network. It should be noted that a plurality of client PCs can be connected to the network.

The user authentication server 3100 manages users who utilize the network and the system running thereon. The client PC 3103 requests an operation on a desired one or ones of electronic documents (hereinafter referred to as the managed electronic documents). An authority of the client PC to access the documents is managed by the document security server 3000, which is a "document management apparatus." As described later, the document security server 3000 collectively manages authorities to access particular electronic documents per user level, and stores an access log as an access history in the access history database 3001. The digital multifunction peripheral 100 creates and outputs images in accordance with a user's request, and saves an operation log as an operation history in the job history database 3011.

Figure 17:
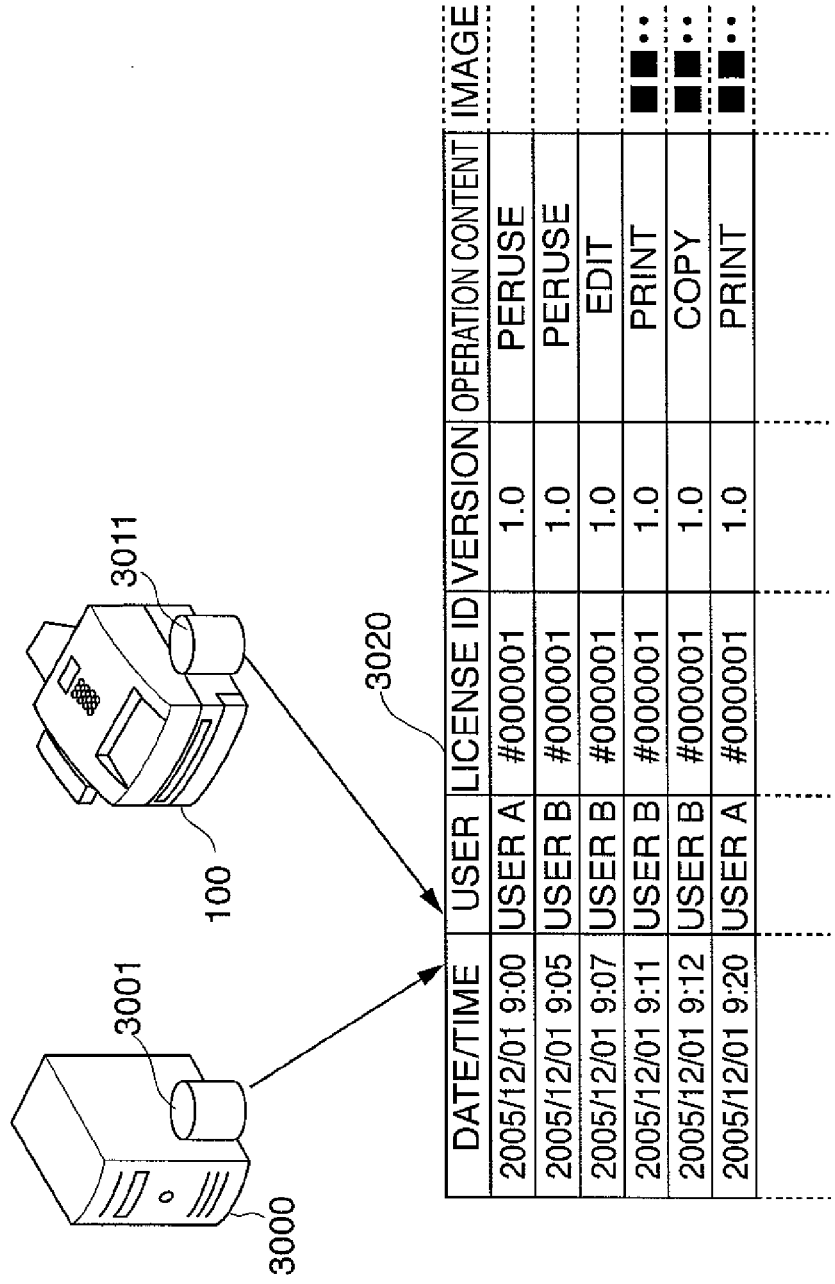
FIG. 17 is a view showing the overall concept of a process implemented by the image processing system shown in FIG. 1.

FIG. 17 is a view showing the overall concept of a process implemented by the image processing system shown in FIG. 1. The document security server 3000 incorporates and manages an access history DB (database) 3001 in which is stored the history of accesses from client PCs 3103 to documents managed by the document security server. On the other hand, the digital multifunction peripheral 100 incorporates and manages a job history DB 3011 in which is saved the history of jobs in the digital multifunction peripheral 100 (operation history).

It is not inevitably necessary for the system to incorporate the history DBs 3001, 3011 therein. These DBs may be incorporated in an external storage apparatus which can be accessed from respective ones of the document security server 3000 and the digital multifunction peripheral 100. As will be described later with reference to FIG. 31, histories relating to documents are acquired from the history DBs 3001, 3011 and are merged into an entire job history DB 3020.

Figure 18:
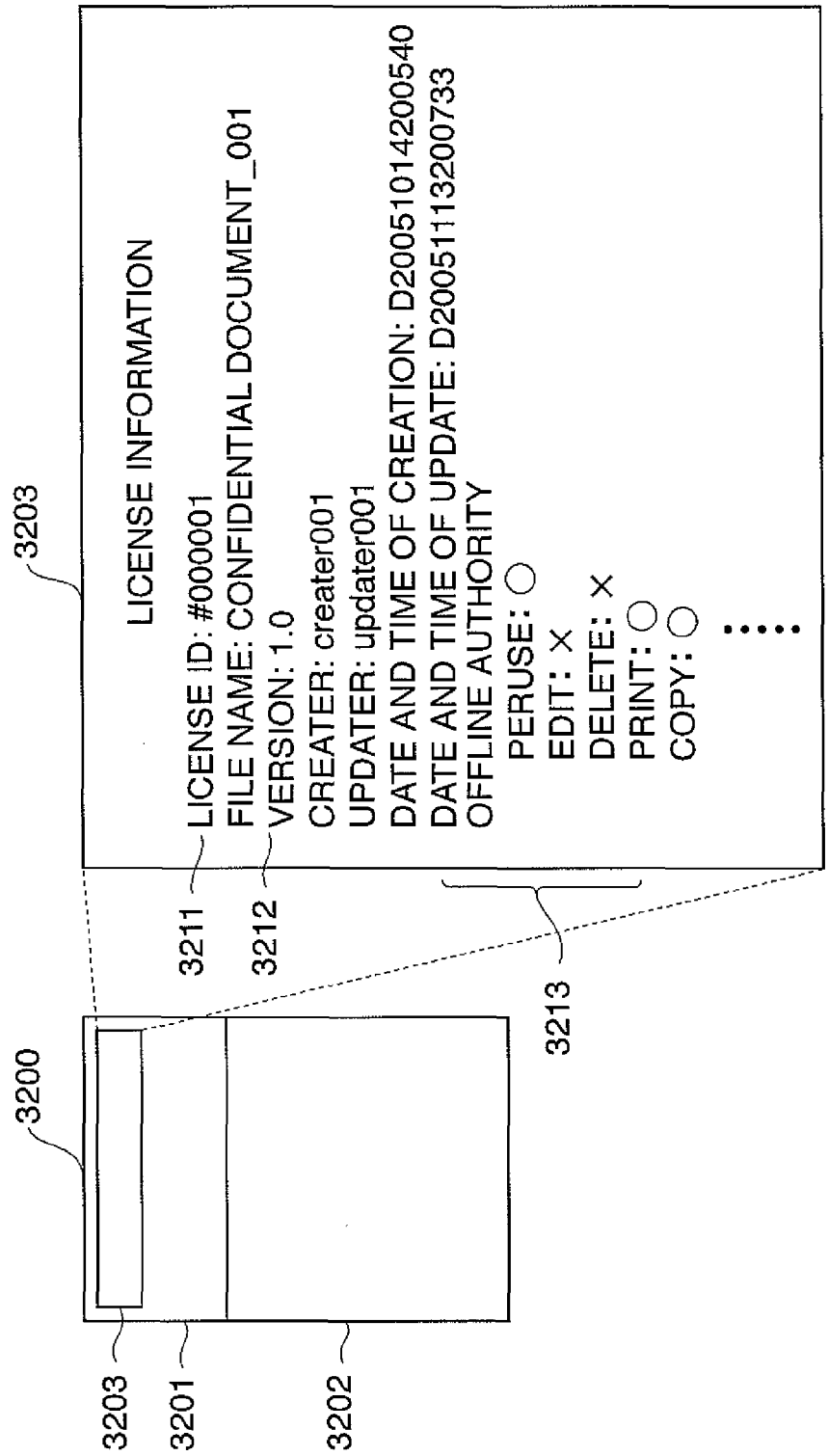
FIG. 18 is a view showing the construction of a managed electronic document, the authority to access the document being managed by a document security server.

FIG. 18 is a view showing the construction of a managed electronic document, the authority to access the document being managed by the document security server 3000.

A managed electronic document 3200 has a header 3201 that is not indicated when this document is displayed or shown by a special purpose application or the like. In a case where the electronic document is browsed or perused through the special purpose application, a main data part 3202 thereof is converted into image data which is then displayed. The header 3201 includes license information 3203 that is required by the document security server 3000 for management of the managed electronic document 3200. The license information 3203 includes a license ID 3211 for identifying the managed electronic document, and the property of the document such as a version 3212, an offline authority 3213, etc. Although not shown in the drawing, there is included information for identifying the document security server 3000 such as for example, an IP address of the document security server 3000.

Next, with reference to FIGS. 18 and 19, an explanation will be given of a method for restricting access to managed electronic documents 3200, the authority to access the documents being managed by the document security server 3000. FIG. 19 is a view showing an example of the access authority information DB managed by the document security server 3000. The document security server 3000 implements the access restriction using the license ID 3211 in the license information 3203.

As shown in FIG. 19, the access authorities for license IDs "00001", "000002", etc. are specified per user level. In other words, the access authorities are set for each of the managed electronic documents 3200 on a user-by-user basis and on an authority item-by-authority item (operation content-by-operation content) basis. For example, if a given authority item for a given user is attached with a circle mark "o", then the user is authorized to operate the authority item. If a cross mark "x" is attached to a given authority item for a given user, the user is not authorized to operate the authority item. Users specified in FIG. 19 are users managed by the user authentication server 3100. Examples of authority items shown in FIG. 19 include "peruse", "edit", "delete", "print" and "copy". The authority to perform "print settings" such as "color print authority" or "one-sided printing" can also be specified.

In a case where a user operating the client PC 3103 attempts to peruse a managed electronic document, the user starts a special purpose application for perusal of managed electronic documents, and performs an operation of opening the managed electronic document. The special purpose application implements control in such a manner that a file is opened only when the user has a perusal authority or when it is determined based on a result of query to the document security server 3000 that the user has the authority. It is assumed here that the user performs login processing at the time of starting the client PC 3103 by using the user authentication server. In making a query to the security server 3000, the special purpose application transmits information that identifies the user logging in the client PC 3103. Based on the transmitted information, the security server 3000 can identify the user's authority to access the document (identified by the license ID) for which the query has been made. The above is not limited to the perusal operation, but may be applied to other authority items designated by the document security server 3000. In the example shown in FIG. 19, the user A can implement all the operations of "peruse", "edit", "delete", "print", and "copy" in respect of the license ID "00001", whereas the user E cannot implement any of these operations.

As shown in FIG. 18, the license information 3203 includes an offline authority 3213 that is utilized when a query about authority to the document security server 3000 cannot be made. The query cannot be made, for example, when the document security server 3000 is failed or disconnected from the network. In respect of the license ID "000001" in the example shown in FIG. 18, the "perusal", "print" and "copy" operations can be made but the "edit" and "delete" operations cannot be made, when the server is in offline state.

FIG. 20 is an example of the access history DB 3001 for managed electronic documents, the authority to access the documents being managed by the document security server 3000.

The access history DB 3001 saves details of an operation performed by a user after making an access to a managed electronic document. Thus, the saved contents are renewed each time access is made. The access history DB 3001 makes records for users managed by the user authentication server 3100.

In the above described access history DB 3001, the history items include by way of example "operation date and time", "user" and "license ID", and include "version" of and "content of operation" on a managed electronic document to be operated, and "remarks". In addition, there may be specified an "operation route identifier" such as the address or host name of a client PC 3103 having been operated.

Next, with reference to FIG. 21, an explanation will be given of a method of identifying a managed document 3200 converted into hard data on a sheet of paper or the like.

Figure 21:
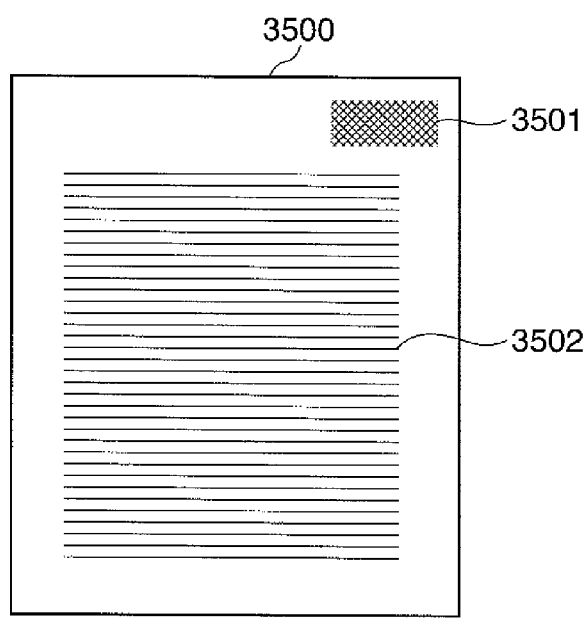
FIG. 21 is a view showing an example of an original which is a sheet of paper on which a managed electronic document is outputted.

FIG. 21 is a view showing an example of an original obtained by a managed electronic document 3200 being outputted onto a sheet of paper. In the original 3500, an image of main data, which is a part to be displayed by the special purpose application, is outputted onto a portion 3502 of the original. License information 3203 (see FIG. 18) required for management by the document security server 3000 is converted into a compressed image 3501 such as a two-dimensional image, which is then embedded in the output image in an unreadable form. By decoding the compressed image 3501, license information 3203 is obtained, whereby the managed electronic document 3200 from which the original has been generated can be identified. Depending on user's settings, the original may be converted into a readable image. It is assumed here that as the compressed image 3501, a bar code such as a QR code is employed. The license information 3203 may be embedded, as information such as digital watermark, in the portion 3502 of the original onto which the main data is outputted.

Figure 39:
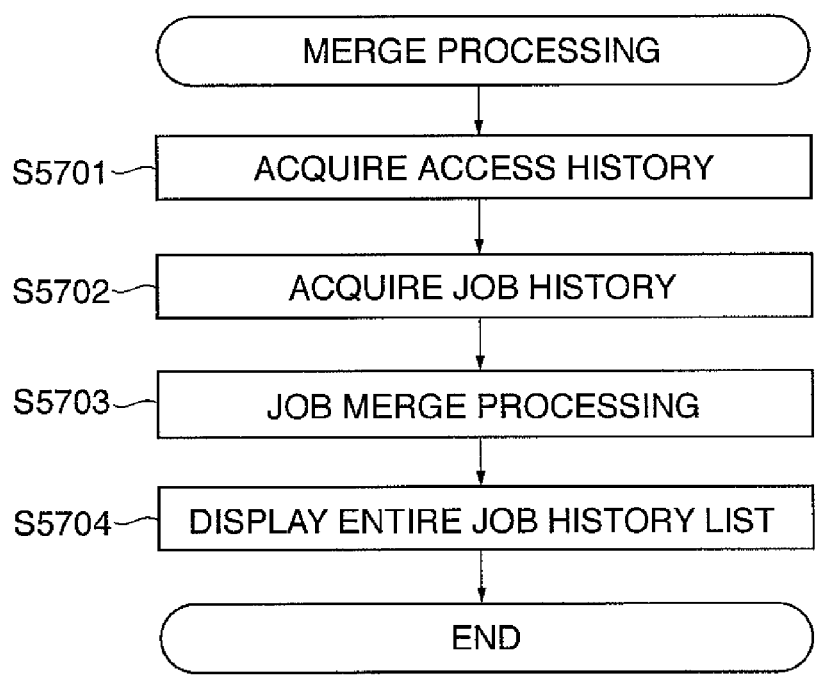
FIG. 39 is a flowchart of merge processing executed by the digital multifunction peripheral.
Figure 40A:
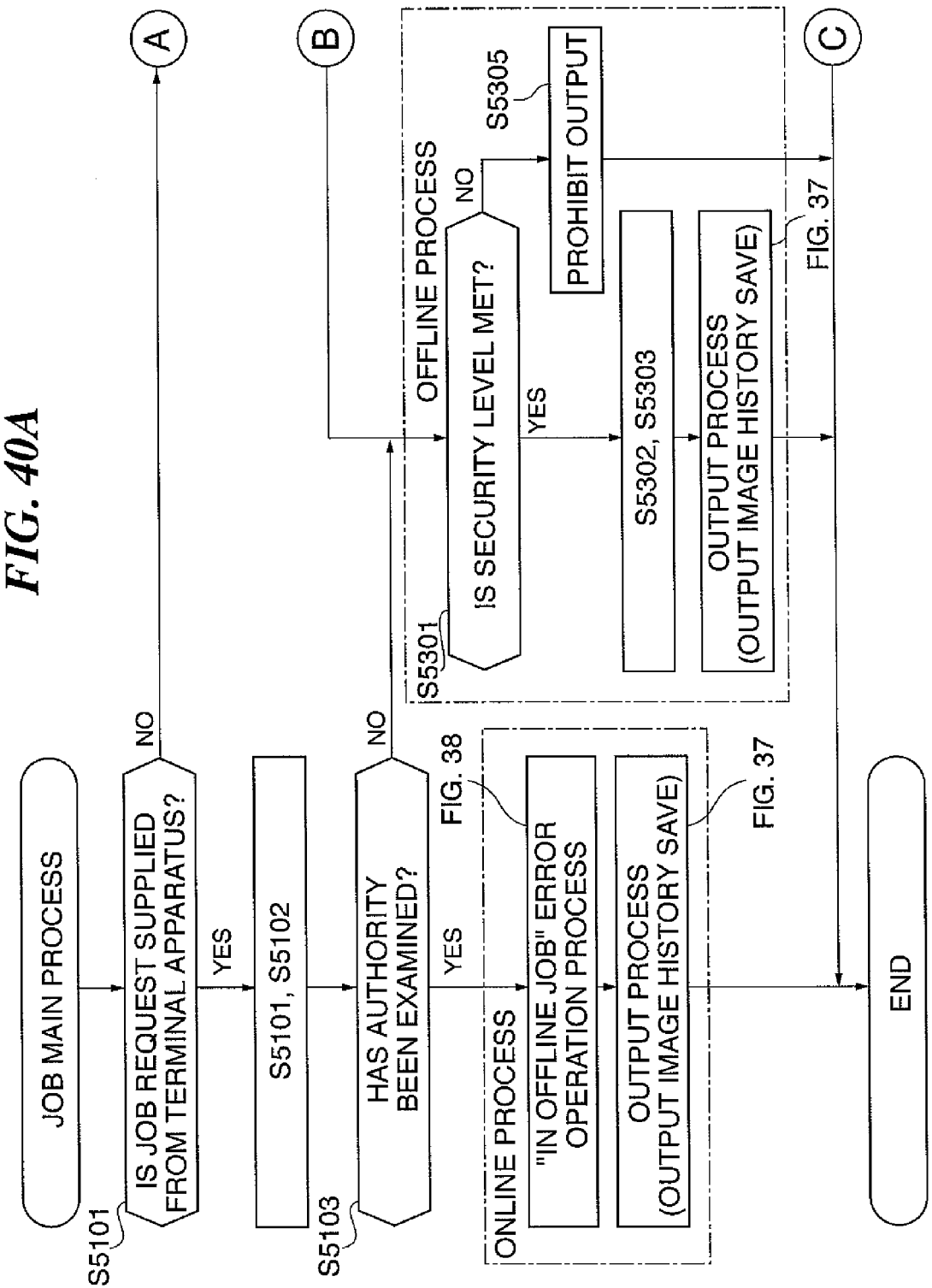
FIGS. 40A and 40B are a flowchart in which processes in FIGS. 32 to 38 are collectively shown to ease the understanding of the whole concept of these processes.
Figure 40B:
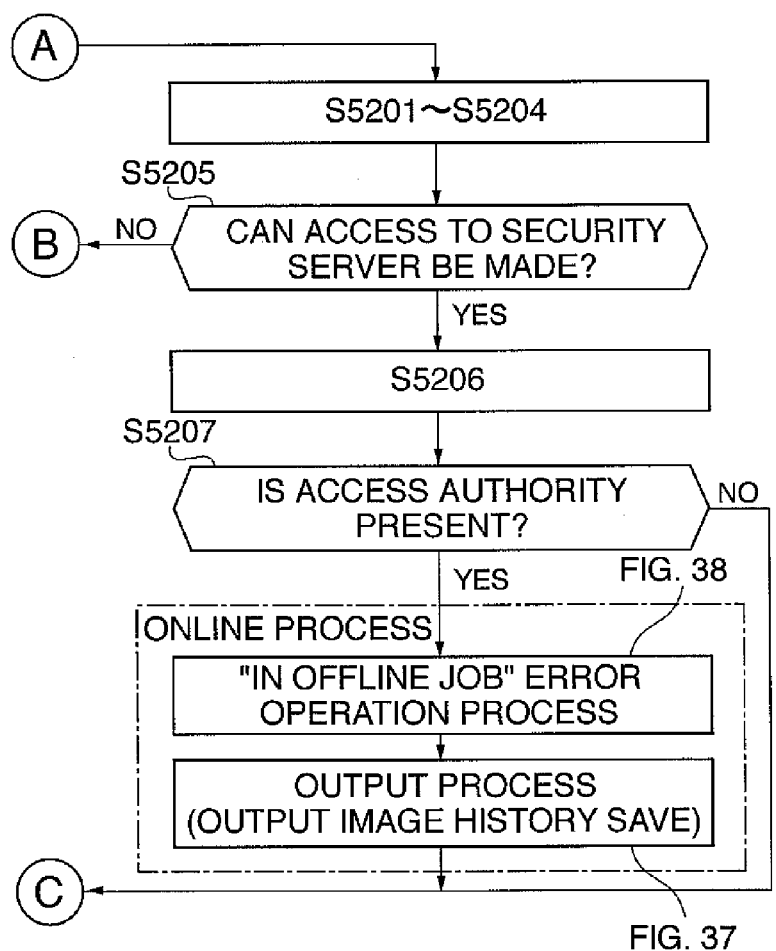

In the above, the characterizing parts and the basic parts of the present invention have schematically been described. With reference to FIGS. 22-31 and FIGS. 32-40, more detailed descriptions will be given below. FIGS. 40A and 40B described later are a flowchart in which the entire process in FIGS. 32-38 is collectively shown.

Figure 32:
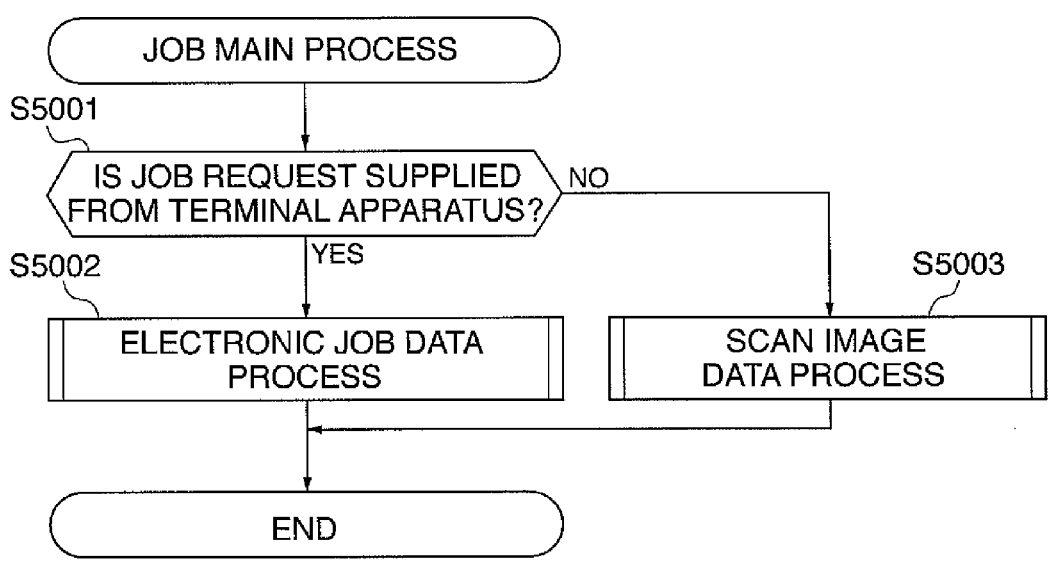
FIG. 32 is a flowchart of a job main process in the digital multifunction peripheral.

FIG. 32 is a flowchart showing a job main process implemented in the digital multifunction peripheral 100. This process is implemented by the CPU 112 that executes a program stored in advance in the ROM 114 or the image storage section 160, and is started when the digital multifunction peripheral 100 receives a job request from a user, for example, by receiving job packets.

There are two types of job request-receiving routes. In one of these routes, a job request from the client PC 3103, which is a terminal device, is received by a LAN controller 414 via the LAN 600. In another route, a job request generated by a user by operating the operating unit 150 of the digital multifunction peripheral 100 or the like is directly received. First, in a step S5001, it is determined whether or not a job request is supplied from the client PC 3103.

If it is determined that the job request is supplied from the client PC 3103, an electronic job data process shown in FIG. 33 described later is executed (step S5002), whereupon the present process is completed. On the other hand, if it is determined that the job request is directly received as a result of the operating unit 150 or the like being operated, a scan image data process shown in FIG. 34 described later is executed (step S5003), and the present process is completed. The electronic job data process will be described in detail with reference to FIGS. 22 and 33, and the scan image data process will be described in detail with reference to FIGS. 23, 23 and 34.

Figure 22:
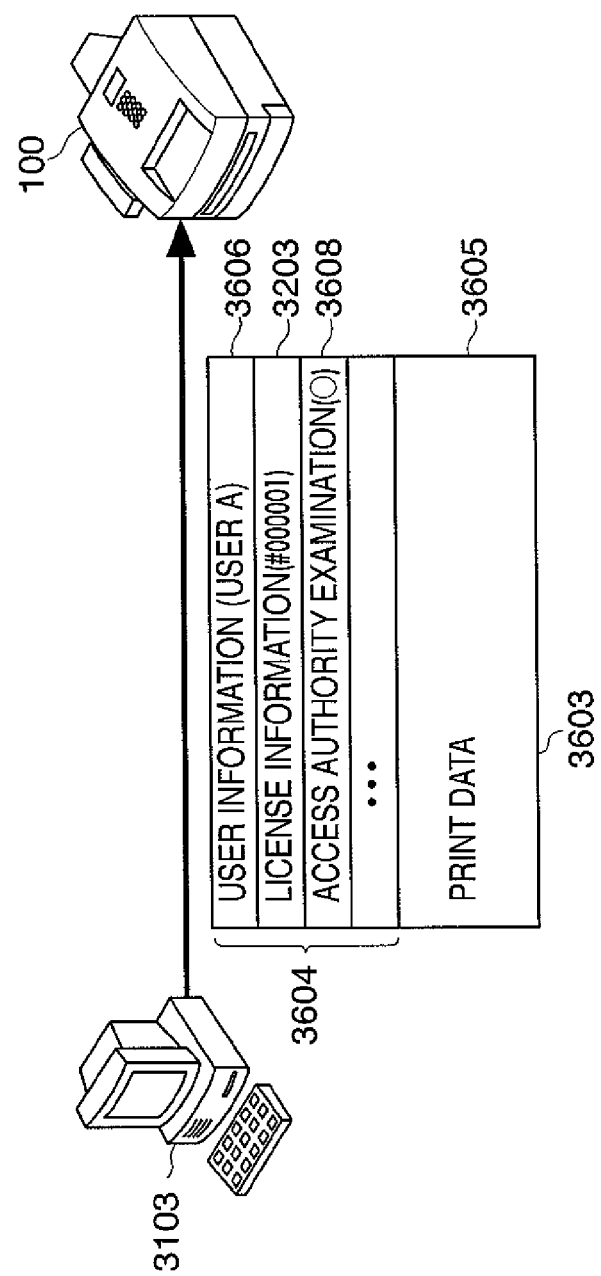
FIG. 22 is a view showing an example in which a print job is transmitted from a client PC to a digital multifunction peripheral via a LAN.

FIG. 22 is a view showing an example in which a print job is transmitted from the client PC 3103 to the digital multifunction peripheral 100 via the LAN 600. This print job 3603 includes a header part 3604 and print data 3605. The header part 3604 includes user information 3606, license information 3203, and access authority examination information 3608.

Based on the user information 3606, a user from whom the job request has been transmitted is identified, and based on the license information 3203, a managed electronic document to be printed is identified. The user information 3606 is obtained when authentication is successfully performed in the user authentication server 3100. The presence of the user information 3606 indicates that the authentication has already been made. The print job 3603 illustrated by way of example in FIG. 22 is a job requested by the user A on a managed electronic document having a license ID "000001".

Figure 33:
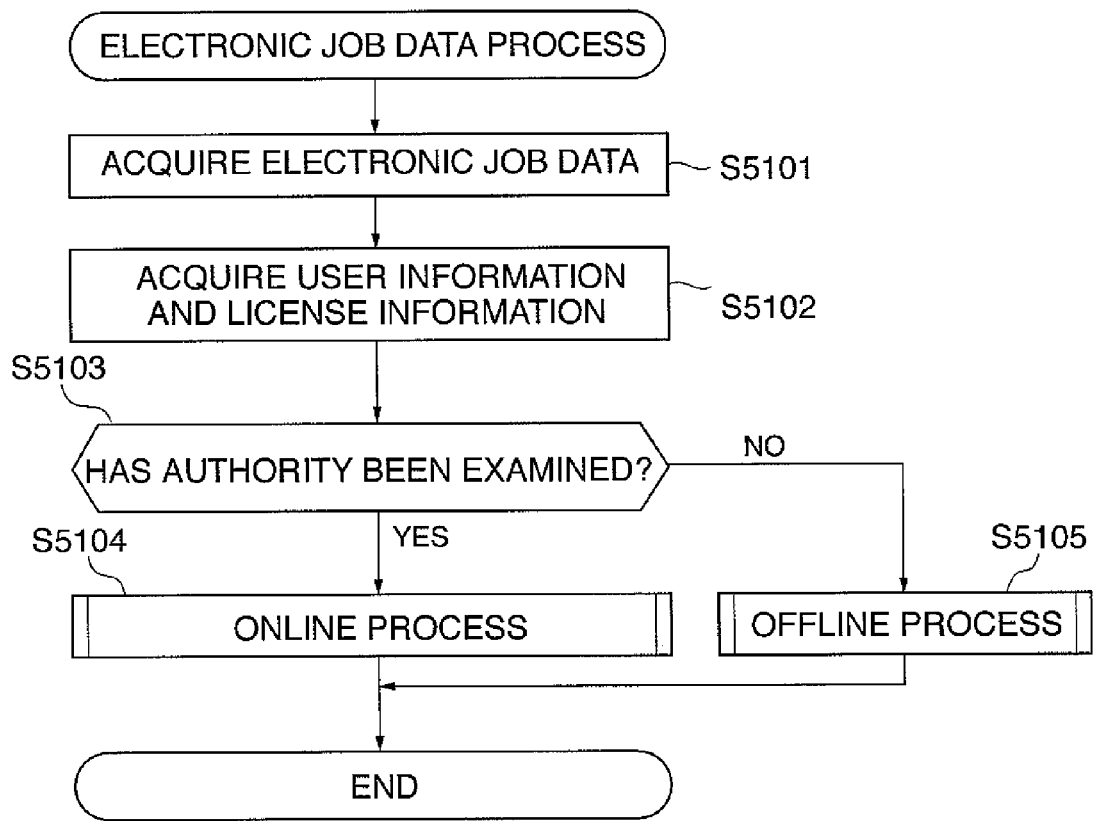
FIG. 33 is a flowchart of an electronic job data process executed in a step S5002 in FIG. 32.

FIG. 33 is a flowchart of an electronic job data process executed in step S5002 in FIG. 32.

First, in a step S5101, the digital multifunction peripheral 100 receives and acquires the print job 3603 from the client PC 3103 via the LAN controller 414. In the next step S5102, user information 3606 and license information 3203 are extracted from the print job 3603. As a result, a user requesting the job and a managed electronic document to be printed can be identified.

In the next step S5103, it is determined whether or not the presently received job is a job for which the authority has already been examined by the document security server 3000. This determination can be carried out based on access authority examination information 3608 in the print job 3603. More specifically, if the access authority examination information 3608 indicates that a circle mark "o" is attached, then it is determined that the authorization examination has already been made. If it is indicated that a cross mark "x" is attached, then it is determined that the presence of authority has not been examined as yet.

As a result of such determination, if it is determined that the authorization examination has already been made, an online process in FIG. 36 described later is executed (step S5104), and the present process is completed. On the other hand, if it is determined that the authorization examination has not been made, an offline process in FIG. 35 described later is executed (step S5105), whereupon the present process is completed.

Figure 23:
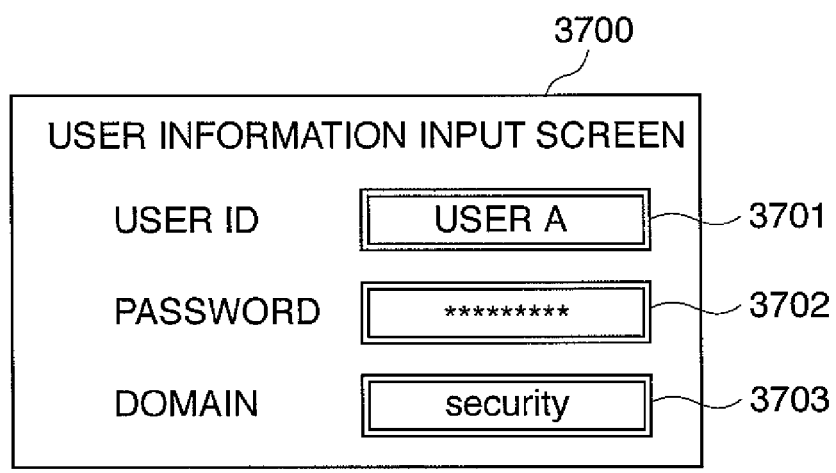
FIG. 23 is a view showing an example of a user authentication screen that is displayed on an operating unit of the digital multifunction peripheral.
Figure 24:
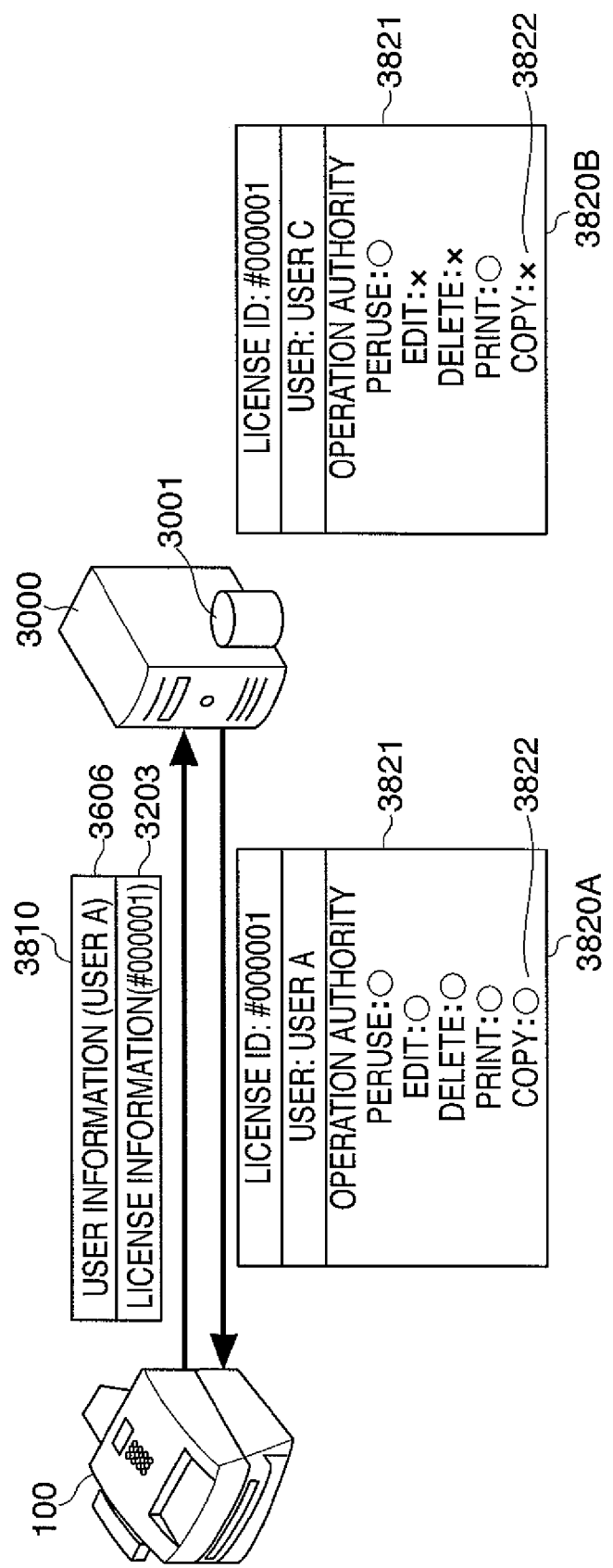
FIG. 24 is a view showing an example of a case where a query is made from the digital multifunction peripheral to the document security server to confirm as to whether or not the access authority is present

FIG. 23 is a view showing an example of a user authentication screen displayed on the operating unit 150 of the digital multifunction peripheral 100. FIG. 24 is a view showing an example of a case where a query is made from the digital multifunction peripheral 100 to the document security server 3000 to confirm whether or not the access authority is present.

Figure 34:
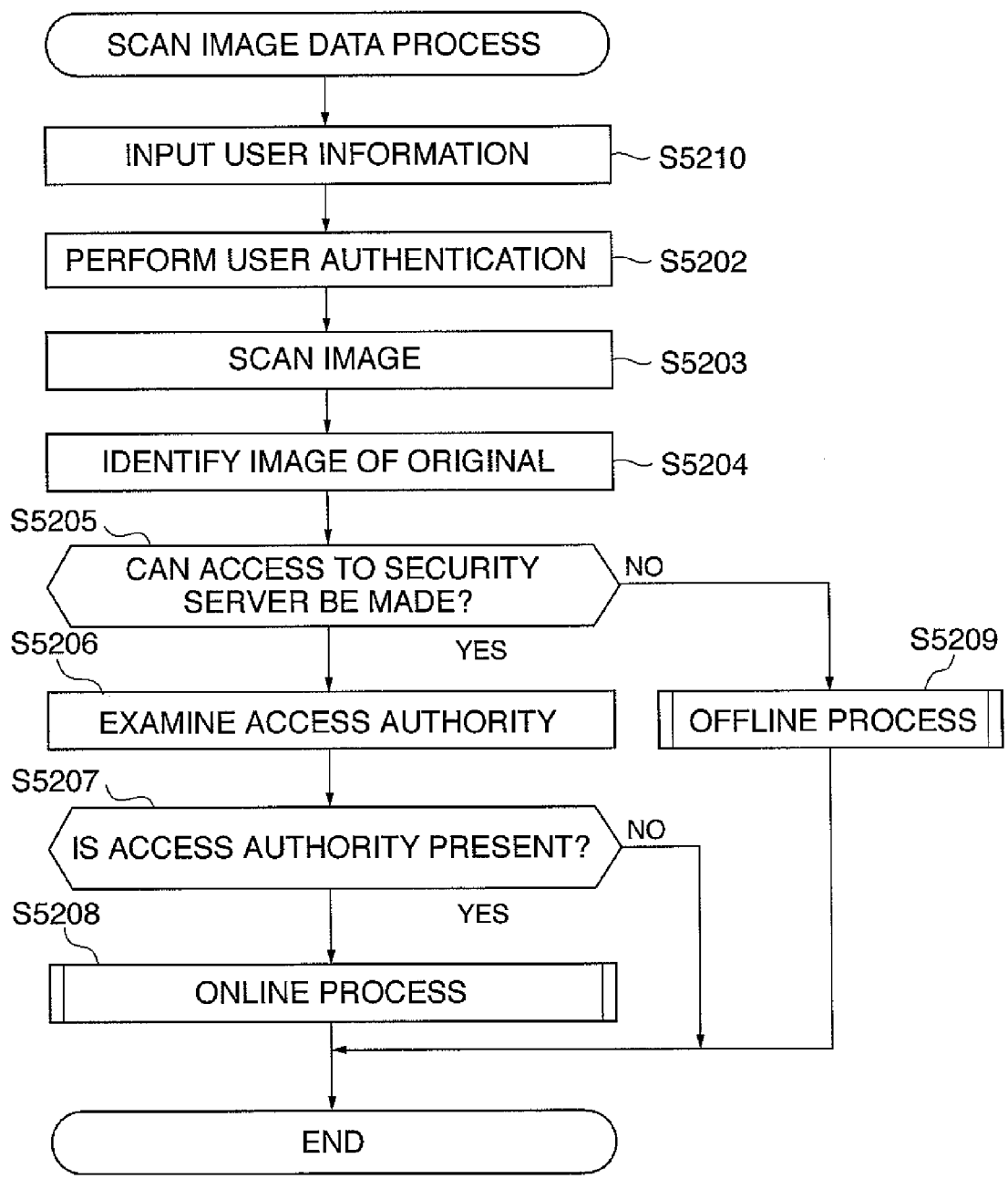
FIG. 34 is a flowchart of a scan image data process executed in step S5003 in FIG. 32.

FIG. 34 is a flowchart of the scan image data process executed in step S5003 in FIG. 32. As an example, an explanation will be given of a case where a user makes a job request to request a copy process of the original 3500 shown in FIG. 21. In that case, the user requests to make a copy of a document, which is one of the managed electronic documents managed by the document security server 3000 and which is outputted as hard data, i.e., the original 3500. For the scan image data process, the user sets the original 3500 in the original feeding unit 250.

First, in a step S5201, the operating unit 150 receives user information 3606 inputted by the user. The user information is received for identifying the user from whom the job request has been issued. As shown in FIG. 23, in accordance with instructions shown in user information input screen 3700 displayed on the operating unit 150, the user inputs a user ID 3701, a password 3702, and a domain 3703, which are user information 3606.

In the next step S5202, based on the data inputted in the step S5201, authentication is implemented by the user authentication server 3100. This authentication processing is implemented until the authentication is successfully completed so that the user may be identified. After the user is identified, the user information 3606 (see FIG. 24) of the user from whom the job request has been issued (for example, the user A in the input example shown in FIG. 23) is acquired.

In the next step S5203, the original 3500 (refer to FIG. 21) set in the original feeding unit 250 is scanned in response to a start button 501 (see FIG. 10) being depressed by the user. Next, in a step S5204, a compressed image 3501 is extracted from the image obtained by the scanning in the step S5203, and is decoded. As a result of the compressed image being decoded, license information 3203 (refer to FIG. 24) can be obtained, making it possible to identify that the scanned original image is a managed electronic document having a license ID "000001", for example.

In a case where no compressed image 3501 is included in the original set in the original feeding unit 250, it is indicated that the original is not a managed electronic document but an ordinary document. In such a case, an ordinary copy process is implemented in accordance with an operation request although an explanation thereof will be omitted.

In the step S5203, inputting electronic document data from the outside may be performed instead of processing to scan the original 3500. In this case, license information 3203 (FIG. 18) is acquired from an electronic document in step S5204.

Subsequently, in a step S5205, it is determined whether or not access to the document security server 3000 can be made. Specifically, a determination is made as to whether or not communication with the document security server 3000 can be performed to make a query about the presence/absence of access authority. As a result, if it is determined that such access can be carried out, then the flow proceeds to a step S5206. On the other hand, it is determined that such access cannot be achieved, an offline process in FIG. 35 described later is executed (step S5209), whereupon the present process is completed.

In the step S5206, the authority of the user, from whom the job request has been issued, to access the managed electronic document to be operated is examined. Specifically, the digital multifunction peripheral 100 transmits access authority examination packets 3810 to the document security server 3000. The access authority examination packets 3810 include the user information 3606 obtained in the step S5202 and the license information 3203 obtained in the step S5204 and indicating the license ID "000001".

In accordance with the received access authority examination packets 3810, the document security serve 3000 extracts a corresponding record 3301 (refer to FIG. 19) from the access authority information DB, and prepares an access authority examination result. Then, the document security server 3000 transmits the prepared access authority search result 3820 back to the digital multifunction peripheral 100 (refer to FIG. 24). In the example shown in FIG. 19, if the copy job having the license ID "000001" has been transmitted, for example from the user A, an access authority search result 3820A is prepared and transmitted back. On the other hand, if the copy job has been transmitted from the user C, then an access authority search result 3820B is prepared and transmitted back (refer to FIG. 24).

As shown in FIG. 24, each of the access authority search results 3820A and 3820B (hereinafter referred to as the access authority search result 3820) includes an operation authority 3821, which includes perusal authority, edit authority, delete authority, print authority, and copy authority 3822. Execution of operations corresponding to authorities attached with a circle mark is permitted, whereas execution of operations corresponding to authorities attached with a cross mark is prohibited.

For example, regarding a copy operation of the managed electronic document having the license ID "000001", the user A having a copy authority 3822 as indicated by a circle mark can perform a copy operation, whereas the user C cannot perform a copy operation since the user C does not have the copy authority 3822 as indicated by a cross mark.

Referring to FIG. 34 again, in a step S5207, the presence/absence of access authority is determined. Specifically, in accordance with the access authority search result 3820 obtained in the step S5206, it is determined whether or not the user who has issued a job request has a copy authority. In a case where it is determined that the user has a copy authority, i.e., access authority, an online process in FIG. 36 as will be described later is executed (step S5208), whereupon the present process is completed. On the other hand, if it is determined that the user has not a copy authority, i.e., access authority, the present process is completed.

Figure 25:
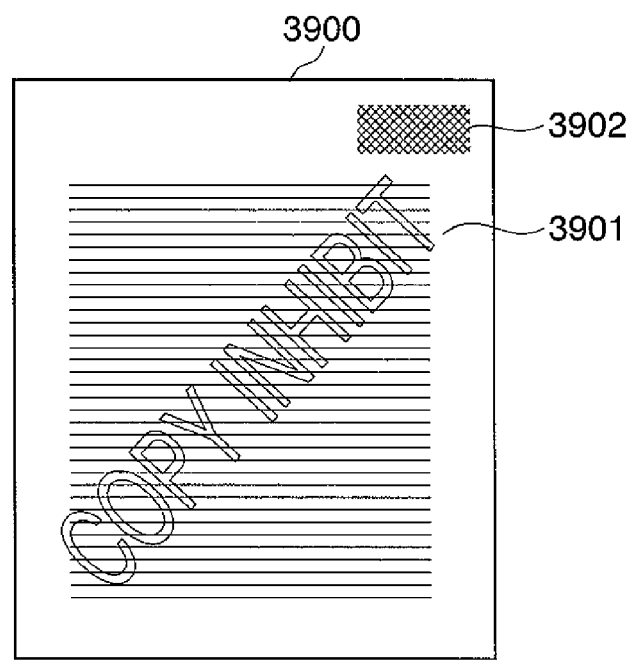
FIG. 25 is a view showing an example of an image outputted in output processing in an offline process.
Figure 26:
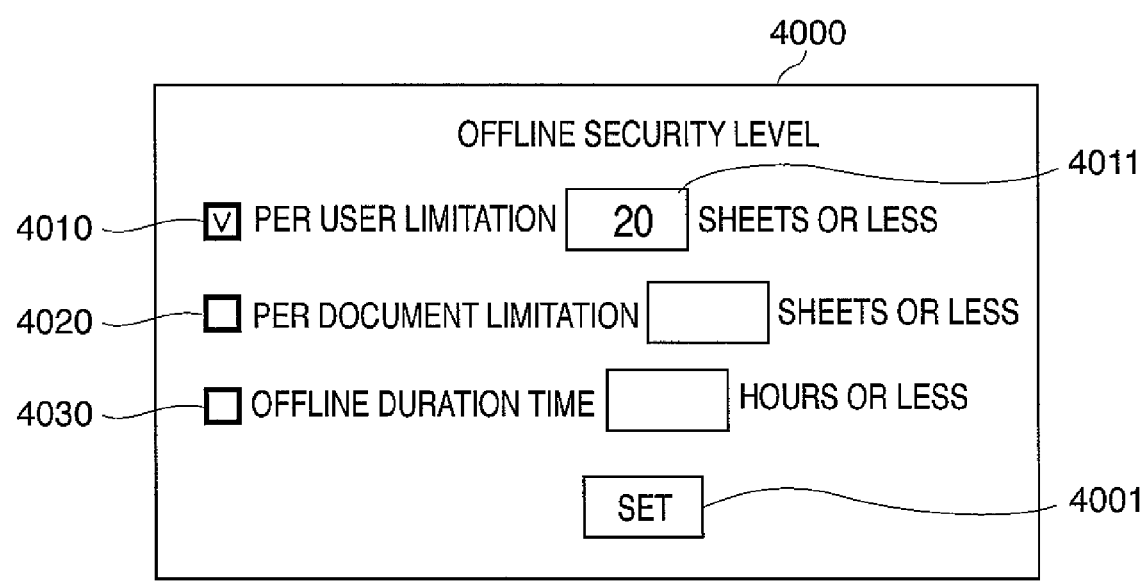
FIG. 26 is a view showing an example of a security level setting screen for use for security level setting.
Figure 35:
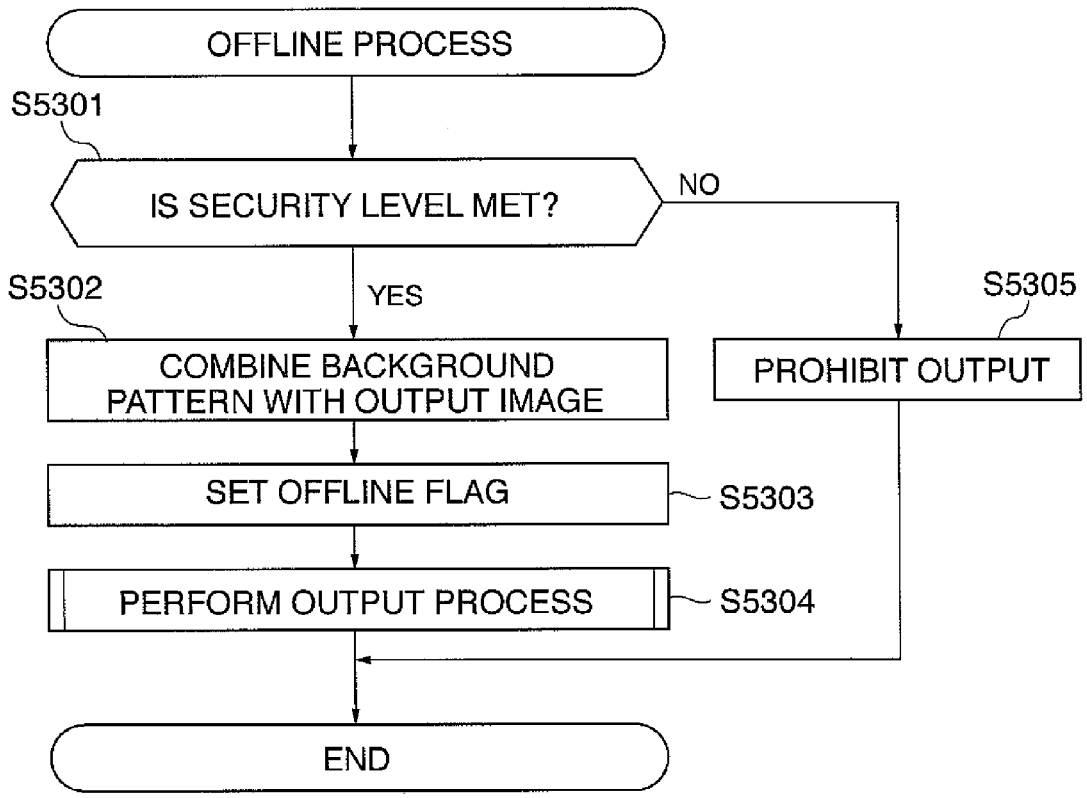
FIG. 35 is a flowchart showing an offline process executed in a step S5105 in FIG. 33 or in a step S5209 in FIG. 34.

In the following, the offline process will be described in detail with reference to FIGS. 25, 26 and 35. FIG. 25 is a view showing an example of an image outputted in the output processing in the offline process. FIG. 26 is a view showing an example of a security level setting screen for use for security level setting. FIG. 35 is a flowchart showing the offline process executed in the step S5105 in FIG. 33 or in the step S5209 in FIG. 34.

The offline security level setting screen 4000 shown in FIG. 26 is displayed on the operating unit 150. Alternatively, the offline security level setting screen is displayed on a web browser on a display section of the client PC 3103 when the digital multifunction peripheral 100 is accessed by a manager from the client PC 3103 in a manager mode. Items set in the offline security level setting screen, which are conditions for permission of operation in a case where the offline process is executed, include a per user limitation 4010 that limits the number of printing per one user, a per document limitation 4020 that limits the total output per one document, and an offline duration time 4030.

For example, in setting the total number of sheets to be outputted per one user to 20 sheets, a value of "20" is inputted to a field 4011 that specifies the number of sheets and then a setup button 4001 is depressed. The set security level is saved in a storage region of the image storage unit 160 of the digital multifunction peripheral 100. The security level setting can be performed by the manager, for instance, and can be changed even after the setting is once completed.

In the offline process, if a certain user requests to perform printing by the number exceeding the total number of 20 sheets, then it is determined that the security level cannot be maintained. It is also determined that the security level cannot be maintained, if the total output number of one document or the offline duration time exceeds the set limit. Out of security level items, one or more items may actually be specified. One or more additional items may be added.

In a step S5301 in FIG. 35, it is determined whether or not the current job request meets (can maintain) the currently set offline security level, and it is further determined whether or not the offline authority 3213 shown in the license information 3203 (FIG. 18) attached to the document is met. As a result of the determination, it is determined that the offline security level is met, the flow proceeds to a step S5302. In the step S5302, a background pattern is combined with an output image of the managed electronic document as the object of job request (a read original image in the case of scan image data process), and the resultant image is used as an image for output. The above is performed to suppress unauthorized reproduction since in the offline process it is impossible to make a query to the document security server 3000 about the presence/absence of access authority. As an example of the background pattern, there may be an indication "copy inhibit" (the background pattern 3901 shown in FIG. 25) or the like. It is assumed here that the background pattern is stored in advance in the image storage unit 160 of the digital multifunction peripheral 100.

Subsequently, in a step S5303, an offline flag (unauthorized operation information) is set in order to clarify that the offline process is being executed. Next, in a step S5304, an output process in FIG. 37 described later is carried out, whereupon the present process is completed. On the other hand, it is determined at the step S5301 that the offline security level is not met, then output is prohibited in a step S5305 so that an operation based on the job request is prohibited, and then the present process is completed. It should be noted that if it is determined in the step S5301 that the security level is not met, the output process may be executed within a restricted range determined based on the offline security level.

Figure 36:
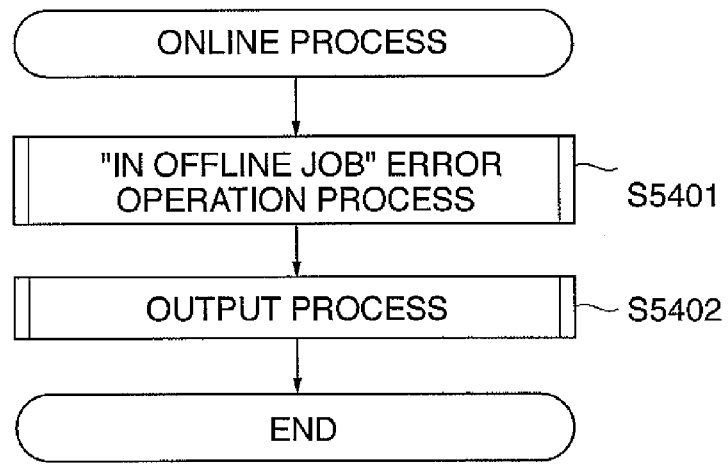
FIG. 36 is a flowchart of an online process that is carried out in a step S5104 in FIG. 33 or a step S5208 in FIG. 34.

FIG. 36 is a flowchart of the online process that is carried out in a step S5104 in FIG. 33 or in a step S5208 in FIG. 34.

First, in a step S5401, an "in offline job" error operation process in FIG. 38 described later is executed. Next, an output process in FIG. 37 described later is executed (step S5402), whereupon the present process is completed.

Figure 37:
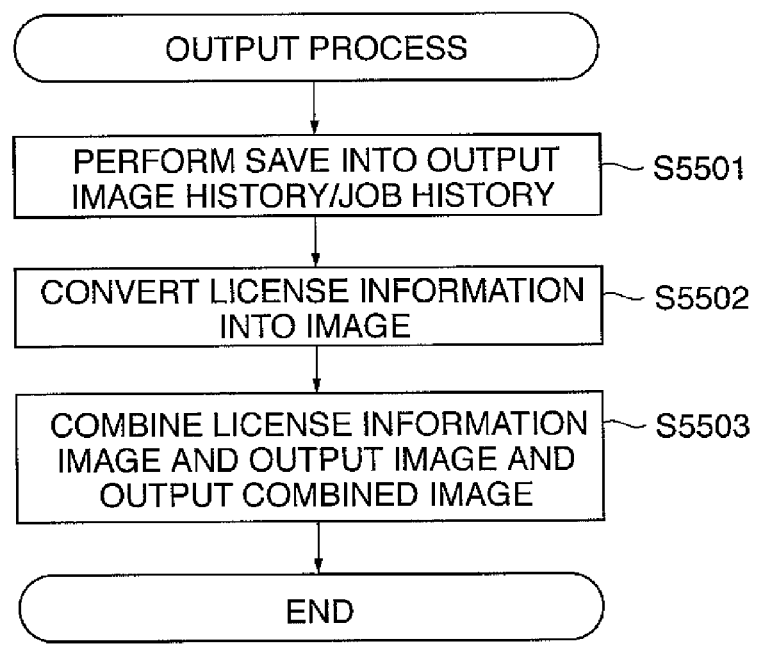
FIG. 37 is a flowchart of an output process executed in a step S5304 in FIG. 35 or a step S5402 in FIG. 36.

FIG. 27 is a view showing an example of an output image history DB in which the history of output images is saved when a job requested from the client PC 3103 is outputted from the digital multifunction peripheral 100. FIG. 28 is a view showing an example of a job history DB that is comprised of the history of jobs requested from the operating unit 150 of the digital multifunction peripheral 100 and the history of jobs implemented in the offline process. FIG. 37 is a flowchart of the output process executed in a step S5304 in FIG. 35 or in a step S5402 in FIG. 36.

First, in a step S5501, processing for performing a save into an output image history/job history is carried out. In a case where a job request has been transmitted from the client PC 3103 and the online process (step S5104 in FIG. 33) has been performed, the history of output images for printout is saved in an output image history DB (refer to FIG. 27). On the other hand, if the job request has been inputted via the operating unit 150 or if the job request has been transmitted from the client PC 3103 and the offline process (step S5105 in FIG. 33) has been performed, the history of output images is saved in a job history DB (refer to FIG. 28). The output image history DB and the job history DB are "operation histories" showing what operations have been made and corresponding to the above descried job history DB 3011 (refer to FIGS. 16 and 17).

Specifically, the output image history DB is stored with the "license ID", "version information" and "output image" of each of documents to be outputted. Referring to an access history DB 3001 (FIG. 20), for example, there is a record 3401 requesting the printing of a document having a license ID of "000001" and a version of 1.0. Similarly, there are requests for printing a document having a license ID of "000001" and a version of 1.1 (records 3402 and 3403). There is a further request for printing a document having a license ID of "000002" and a version of 2.0 (record 3404).

In these cases, the output image history DB (FIG. 27) is stored with images 4101 corresponding to the record 3401, images 4102 corresponding to the records 3402, 3404, and images 4103 corresponding to the record 3404. On the other hand, the job history DB (FIG. 28) is stored with "date and time" indicating the date and time of operation, "user", "license ID", "version", "content of operation", "image", "offline", and "remarks".

The "offline" field is for clearly indicating execution of the offline process. In the step S5303 in FIG. 35, unauthorized operation information such as a circle mark is attached to an operation for which the offline flag has been set, but nothing is attached to other operations. For example, the history records 4201, 4202 are recognized as being obtained after execution of the online process, whereas the history records 4203 to 4206 are recognized as being obtained after execution of the offline process.

In a step S5502, license information 3203 acquired in the step S5102 in FIG. 33 or in the step S5204 in FIG. 34 is formed into an image, i.e., converted into a compressed image 3501 or 3902 (refer to FIGS. 21 and 25). Specifically, in a case where a job request has been transmitted from the client PC 3103 and the online process has been performed, the license information is converted into the compressed image 3502. Otherwise, the license information is converted into the compressed image 3902. These compressed images 3501, 3902 may be any images having contents not capable of being recognized at a glance, and the form of conversion is not significant. The compressed images may be visible or invisible images according to user's settings.

Subsequently, in a step S5503, the compressed image 3501 or 3902 generated in the step S5502 is combined with the primary output image and the resultant image is outputted, whereupon the present process is completed. In a case where the offline process has been performed, the primary output image corresponds to an image for output which has been combined with the background pattern 3901 in the step S5302 in FIG. 35. In the case of the offline process having been performed, the image 3900 including the background pattern 3901 and the compressed image 3902 is outputted (see FIG. 25). On the other hand, in the case of the online process having been performed, the original 3500 including the compressed image 3501 is outputted (see FIG. 21).

Figure 38:
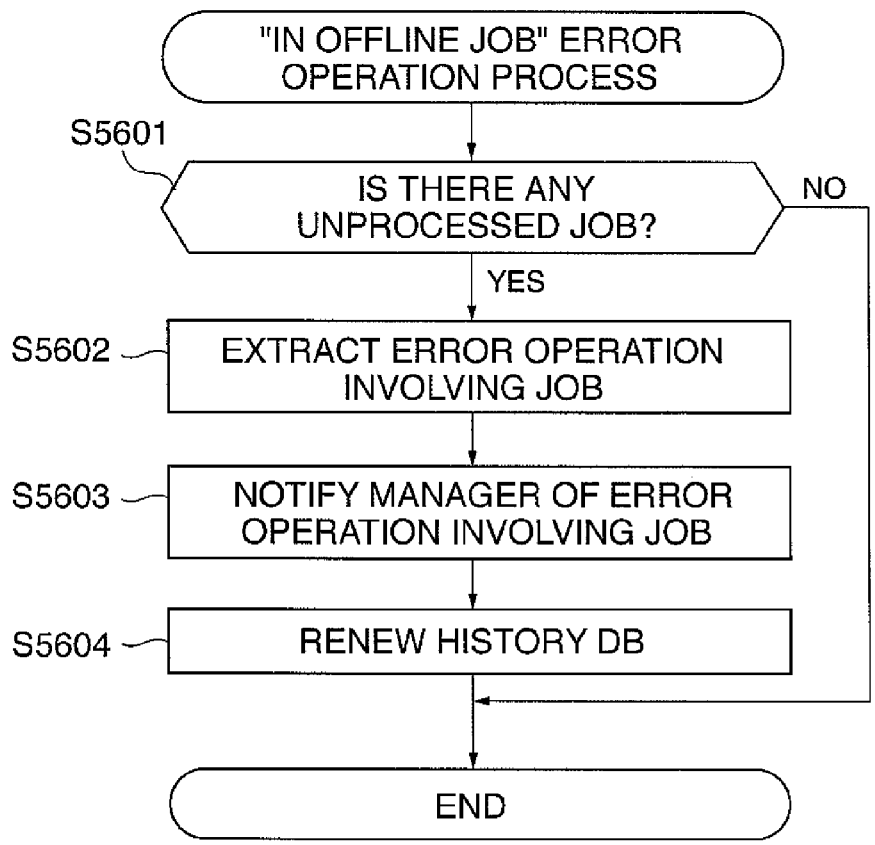
FIG. 38 is a flowchart of an "in offline job" error operation process executed in a step S5401 in FIG. 36.

FIG. 38 is a flowchart of an "in offline job" error operation process executed in a step S5401 in FIG. 36. FIG. 29 is a view showing an error operation involving job history that indicates error operations in the offline process. In this embodiment, the term "erroneously operated job" or "error operation involving job" indicates, among history records for each of which an offline flag is set in the job history DB in FIG. 28, a job in which a document to be operated is accessed without access authority.

First, in a step S5601 in FIG. 38, it is determined whether or not there remains in the job history DB (FIG. 28) a history record for which error operation confirmation has not been performed in the offline process to determine whether or not an error operation involving job is included in the record. Out of the history records in the job history DB (FIG. 28), history records (unauthorized operation histories) for each of which a circle mark is indicated in the offline field are ones that have not been subjected to the error operation confirmation.

If a result of the determination in the step S5601 indicates that there is no unprocessed job, i.e., there is no history record that has not been subjected to the error operation confirmation, the present process is completed. On the other hand, in a case where there remains an unprocessed history record, the flow proceeds to a step S5602. In the step S5602, a history record for which a circle mark is indicated in the offline field is extracted. In the case of the job history DB (FIG. 28), history records 4203 to 4206 are extracted.

In a step S5603, the error operation confirmation is first carried out. Specifically, as with the steps S5206 and S5207 in FIG. 34, access authority examination packets 3810 are prepared using pieces of user information and license IDs contained in the extracted history records. The prepared packets are transmitted to the security server 3000 to make a query about whether users from which job requests have been issued have authorities to access managed electronic documents to be operated. For history records for which there are no access authorities, information indicating these history records and absence of access authorities is transmitted via e-mail to a mail address of the manager. Specifically, history records for which no access authorities are present are extracted, and an error operation involving job history is prepared (refer to FIG. 29) and transmitted via e-mail.

Next, in a step S5604 in FIG. 38, the job history DB (FIG. 28) is renewed. FIG. 30 is a view showing an example of the renewed job history DB that is renewed by the processing in the step S5604. Based on the result of the error operation confirmation, a circle mark is renewed in the offline field for each of the concerned history records in the job history DB (FIG. 28), whereby the concerned history records are made so as not to be extracted in the next offline error operation process.

For example, the circle mark in history records with access authority (i.e., involving no error operation) is changed to a symbol such as a double circle indicating that the error operation confirmation has been performed and no error operation has been caused. On the other hand, the circle mark in history records with no access authority (i.e., involving an error operation) is changed to a symbol such as a black circle indicating that an error operation has been caused. Marks to be used are not limited to being a double circle and a black circle, but may be any marks capable of indicating results of the error operation confirmation.

When a job is generated, a record is added to the job history DB. Thus, the job history DB is renewed each time the online process is carried out.

The "in offline job" error operation process may be executed in any timing other than that in the step S5401 in the online process shown in FIG. 36 as long as the document security server 3001 is accessible from the digital multifunction peripheral 100.

In the following, merge processing in which all histories are merged and displayed will be explained. FIG. 39 is a flowchart of the merge processing executed by the digital multifunction peripheral 100. The merge processing is started in response to an instruction for execution of the merge processing given by a manager from the operating unit 150 of the digital multifunction peripheral 100.

First in the step S5701, information recorded in the access history DB 3001 (FIG. 20) is acquired from the document security server 3000. As a result, the entire history of accesses to the managed electronic documents from one or more client PCs 3103 in the online processing can be recognized. In the next step S5702, information recorded in the job history DB (FIG. 30) is acquired. As a result, operation jobs from the operating unit 150 and the entire history of operation jobs in offline can be recognized.

In a step S5703, one or more history records each including at least one image outputted from the digital multifunction peripheral 100 are extracted from the access history DB 3001 acquired in the step S5701. Based on the license IDs and version information in the history records, these history records are made to correspond to an output image history DB (FIG. 27). Then, the history records made related to the output image history DB and the job history DB acquired in the step S5702 are merged together to generate an entire job history DB 3020. In the next step S5704, the entire job history DB 3020 generated in the step S5703 is displayed in a list. In a case where a request for execution of merge processing has been transmitted from the client PC installed outside the digital multifunction peripheral 100 and operated by, for example, the manager, the list of the entire job history DB may be outputted to the client PC from which the request has been issued.

FIG. 31 is a view showing an example of the entire job history DB 3020. Such indication may be displayed on the client PC operated by the manager or on the display panel 500 of the operating unit 150 of the digital multifunction peripheral 100. Based on the entire job history DB 3020, the manager can easily grasp that accesses have been made and what operations have been made in respect of job requests from the client PC 3103 and transmitted through the operating unit 150. It should be noted that operation routes (whether by way of the client PC or direct operation in the digital multifunction peripheral 100) can also be determined, and therefore, only a job history relating to the digital multifunction peripheral 100 can be displayed.

It should also be noted that the merge processing in the flowchart of FIG. 39 may not be executed by the digital multifunction peripheral 100, but may be executed by the document security server 3000.

FIGS. 40A and 40B are a flowchart in which the processes in FIGS. 32 to 38 are collectively shown as described above, and therefore, detailed contents of these processes are the same as those already described with reference to FIGS. 32 to 38.

According to this embodiment, the entire history of accesses to the managed documents managed by the document security server and the job history can be left. Furthermore, these histories can be merged and displayed, whereby the manager can easily review the entire history.

In a case where a job request has been issued from the client PC 3103 and there is no access authority, the security level is checked for (step S5301). Also in a case where a job request is issued via the operating unit 150 and access to the document security server 3000 cannot be performed, the security level is checked for. If the security level is not met, then outputting is prohibited. As a result, in a case where the access authority is absence or cannot be confirmed, operation is permitted under given conditions, whereby unrestraint operation can be prohibited. It should be noted that outputting may be made without the security level being checked for.

When the job history is saved (step S5501) in the job history DB, unauthorized operation information such as a circle mark is attached to an operation for which the offline process has been performed. As a result, it is possible to grasp documents operated with no access authority or with the presence or absence of access authority unknown.

Since the error operation confirmation at offline time is performed (FIG. 38) in the offline process, it is possible to confirm the presence or absence of authority to access documents operated in the past without access authority or with the presence or absence of access authority not determined. Furthermore, the manager is notified of history records with no access authority. This makes it easy for the manager to recognize and pursue documents operated with no access authority or with the presence/absence of access authority not determined.

Since the job history DB and the output image history DB, which are operation histories, are merged with the access history DB and the merged history is displayed (FIG. 39), the entire history of accesses to the managed electronic documents and the operation history can easily be perused.

In a case where an operation for print output or copy output is performed, license information 3203 converted into a decodable compressed image 3501 or 3902 is added to an image (FIG. 37). As a result, there can be performed security management of documents even after having been converted into originals.

The present invention is not limited to the above described embodiment, but can be modified in various manners, which should not be excluded from within the scope of the present invention insofar as functions as recited in the appended claims or the functions performed by the construction of the above described embodiment can be achieved. Further, the present invention may either be applied to a system composed of a plurality of apparatuses or to a single apparatus.

It is to be understood that the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, a DVD+RW, a magnetic tape, a nonvolatile memory card, and a ROM.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2006-132608, filed May 11, 2006 which is hereby incorporated by reference herein in its entirety.

What is claimed is:

1. An image output apparatus connected via a network to at least one terminal apparatus and to a document management apparatus adapted to record access history information indicating a history of accesses to document data, comprising:
   a reception unit adapted to receive an output request for output of document data to which the terminal apparatus has accessed;
   an execution unit adapted to execute processing based on the output request received by said reception unit;
   a processing history record unit adapted to record processing history information indicating a history relating to the processing executed by said execution unit; and
   a control unit adapted to perform control such that, in a case where a history of accesses from the terminal apparatus to the document data for which the output request has been received by said reception unit has not been recorded as the access history information in the document management apparatus, a history relating to processing performed on the document data by said execution unit based on the output request and information indicating that a history of accesses from the terminal apparatus to the document data has not been recorded in the document management apparatus are recorded as processing history information in said processing history record unit;
   wherein the document management apparatus is capable of managing authorities to access the document data on a user-by-user basis,
   wherein the image output apparatus further comprises an identification unit adapted to identify, based on the output request received by said reception unit, a user from whom the output request has been issued and document data to be processed, a query unit adapted to make a query to the document management apparatus about an authority of the user identified by said identification unit to access the identified document data, and a determination unit adapted to determine whether the processing can be executed by said execution unit based on a response to the query from said query unit to the document management apparatus about the authority to access the document data, and
   wherein in a case where said determination unit has determined that said execution unit can execute the processing, said execution unit executes the processing in accordance with the processing request received by said reception unit.

2. The image output apparatus according to claim 1, wherein in a case where the history of accesses from the terminal apparatus to the document data for which the output request has been received by said reception unit has been recorded as the access history information in the document management apparatus, said control unit performs control so as not to record the information indicating that the history of accesses from the terminal apparatus to the document data has not been recorded in said processing history record unit.

3. The image output apparatus according to claim 1, wherein said query unit makes a query to the document management apparatus about the authority of the user, who has been identified by said identification unit and from whom the output request has been issued, to access document data corresponding to the processing history information for which the information indicating that the history of accesses from the terminal apparatus to the document data has not been recorded in the document management apparatus has been recorded by said processing history record unit, and
   wherein in a case where the response to the query has been given from the document management apparatus, said processing history record unit records, in the processing history information, information indicating that the query has been made to the document management apparatus.

4. The image output apparatus according to claim 3, wherein a notification is performed to a predetermined notified party in a case where, in response to the query from said query unit about the authority of the user, who has been identified by said identification unit and from whom the output request has been issued, to access document data corresponding to the processing history information, for which information indicating that the history of accesses from the terminal apparatus to the document data has not been recorded in the document management apparatus has been recorded by said processing history record unit, the document management apparatus responds that the user from whom the output request has been issued has no authority to access the document data.

5. The image output apparatus according to claim 1, further comprising:

a processing history transmission unit adapted to transmit, to the document management apparatus, the processing history information in which the information indicating that the history of accesses from the terminal apparatus to the document data has not been recorded in the document management apparatus has been recorded by said processing history record unit.

6. The image output apparatus according to claim 1, wherein the document data includes offline access authority information that is referred to in a case where the terminal apparatus or the image output apparatus cannot make a query to the document management apparatus about presence or absence of the authority to access the document data, and in a case where the history of accesses from the terminal apparatus to the document data for which the output request has been issued has not been recorded in the document management apparatus, said determination unit determines whether or not the processing can be executed by said execution unit with reference to the offline access authority information.

7. An image output apparatus connected via a network to at least one terminal apparatus and to a document management apparatus adapted to record access history information indicating a history of accesses to document data, comprising:

a reception unit adapted to receive an output request for output of document data to which the terminal apparatus has accessed;

an execution unit adapted to execute processing based on the output request received by said reception unit;

a processing history record unit adapted to record processing history information indicating a history relating to the processing executed by said execution unit; and a control unit adapted to perform control such that, in a case where a history of accesses from the terminal apparatus to the document data for which the output request has been received by said reception unit has not been recorded as the access history information in the document management apparatus, a history relating to processing performed on the document data by said execution unit based on the output request and information indicating that a history of accesses from the terminal apparatus to the document data has not been recorded in the document management apparatus are recorded as processing history information in said processing history record unit;

wherein in a case where the history of accesses from the terminal apparatus to the document data for which the output request has been issued has not been recorded in the document management apparatus, said control unit restricts conditions for an output request-based output by said execution unit in accordance with restriction information set in advance in the image output apparatus.

8. An image output apparatus connected via a network to at least one terminal apparatus and to a document management apparatus adapted to record access history information indicating a history of accesses to document data, comprising:

a reception unit adapted to receive an output request for output of document data to which the terminal apparatus has accessed;

an execution unit adapted to execute processing based on the output request received by said reception unit;

a processing history record unit adapted to record processing history information indicating a history relating to the processing executed by said execution unit; and a control unit adapted to perform control such that, in a case where a history of accesses from the terminal apparatus to the document data for which the output request has been received by said reception unit has not been recorded as the access history information in the document management apparatus, a history relating to processing performed on the document data by said execution unit based on the output request and information indicating that a history of accesses from the terminal apparatus to the document data has not been recorded in the document management apparatus are recorded as processing history information in said processing history record unit;

an acquisition unit adapted to acquire the history of accesses to the document data recorded in the document management apparatus;

an extraction unit adapted to extract, from among histories relating to processing executed by said execution unit and recorded by said processing history record unit, the history in which the information indicating that the history of accesses from the terminal apparatus to the document data has not been recorded in the document management apparatus;

a merge unit adapted to merge the history acquired by said acquisition unit and the history extracted by said extraction unit; and a history output unit adapted to provide a visible output of the history merged by said merge unit.

9. An image output apparatus connected via a network to a document management apparatus adapted to record access history information indicating a history of accesses to document data, comprising:

an input unit adapted to input document data;

an execution unit adapted to execute output processing on the document data inputted by said input unit;

a processing history record unit adapted to record processing history information indicating a history relating to the output processing executed by said execution unit; and an access unit adapted to access the document management apparatus based on information to make access to the document management apparatus in a case where the information to make access to the document management apparatus is extracted from the document data on which said execution unit has executed the output processing, said access unit being adapted to transmit to the document management apparatus the processing history information relating to the output processing executed by said execution unit in a case where said access unit can access the document management apparatus, and said processing history record unit being adapted to record the processing history information relating to the output processing executed by said execution unit and information indicating that history information relating to the output processing has not been transmitted to the document management apparatus in a case where said access unit cannot access the document management apparatus;

wherein:

the document data is attached with information that identifies the document data, the document management apparatus is capable of managing authorities to access the document data on a user-by-user basis, the image output apparatus includes a user identification unit adapted to identify a user who has given an instruction for execution of the output processing by said execution unit, and said access unit is adapted to notify the document management apparatus of information indicating the user identified by the user identification unit and the information that identifies the document data and to determine whether or not the output processing can be executed by the execution unit in accordance with the instruction given by the user.

10. The image output apparatus according to claim 9, wherein said input unit comprises a reader unit which reads an original and inputs document data based on an image of the original, and wherein the original read by said reader unit is combined with information to make access to the document management apparatus.

11. The image output apparatus according to claim 9, further comprising:
a restriction unit adapted to restrict the output processing executed by the execution unit in a case where the access unit cannot access the document management apparatus.

12. The image output apparatus according to claim 9, wherein in a case where the access unit cannot access the document management apparatus, said execution unit combines a background pattern with the document data in the output processing.

13. The image output apparatus according to claim 9, wherein the output processing executed by said execution unit provides a visible output of the document data, and
wherein said execution unit combines the information to make access to the document management apparatus extracted from the document data with the visible output.

14. The image output apparatus according to claim 9, wherein in a case where said access unit cannot access the document management apparatus, the processing history information relating to the output processing recorded by said processing history record unit is transmitted to the document management apparatus after the access unit is made accessible to the document management apparatus.

15. A history management method for an image output apparatus connected via a network to at least one terminal apparatus and to a document management apparatus adapted to record access history information indicating a history of accesses to document data, comprising:
a reception step of receiving an output request for output of document data to which the terminal apparatus has accessed;
an execution step of executing processing based on the output request received in said reception step;
a processing history record step of recording processing history information indicating a history relating to the processing executed in said execution step; and
a control step of performing control such that, in a case where a history of accesses from the terminal apparatus to the document data for which the output request has been received in said reception step has not been recorded as the access history information in the document management apparatus, a history relating to processing performed on the document data in said execution step based on the output request and information indicating that a history of accesses from the terminal apparatus to the document data has not been recorded in the document management apparatus are recorded as processing history information in said processing history record step;
wherein the document management apparatus is capable of managing authorities to access the document data on a user-by-user basis,
wherein the method further comprises an identification step of identifying, based on the output request received by said reception step, a user from whom the output request has been issued and document data to be processed, a query step of making a query to the document management apparatus about an authority of the user identified by said identification step to access the identified document data, and a determination step of determining whether the processing can be executed by said execution step based on a response to the query from said query step to the document management apparatus about the authority to access the document data, and
wherein in a case where said determination step has determined that said execution step can execute the processing, said execution step executes the processing in accordance with the processing request received by said reception step.

16. A history management method for an image output apparatus connected via a network to a document management apparatus adapted to record access history information indicating a history of accesses to document data, comprising:
an input step of inputting document data;
an execution step of executing output processing on the document data inputted in said input step;
a processing history record step of recording processing history information indicating a history relating to the output processing executed in said execution step; and
an access step of accessing the document management apparatus based on information to make access to the document management apparatus in a case where the information to make access to the document management apparatus is extracted from the document data on which the output processing has been executed in said execution step, said access step transmitting said processing history information relating to the output processing executed in said execution step to the document management apparatus in a case where access to the document management apparatus can be made in said access step, and said processing history record step recording the processing history information relating to the output processing executed in said execution step and information indicating that history information relating to the output processing has not been transmitted to the document management apparatus in a case where access to the document management apparatus cannot be made in said access step;
wherein:
the document data is attached with information that identifies the document data,
the document management apparatus is capable of managing authorities to access the document data on a user-by-user basis,
the image output apparatus performs a user identification step of identifying a user who has given an instruction for execution of the output processing by said execution step, and
said access step notifies the document management apparatus of information indicating the user identified by the user identification step and the information that identifies the document data and to determine whether or not the output processing can be executed by the execution step in accordance with the instruction given by the user.

17. A non-transitory computer-readable storage medium including a history management program for causing a computer to execute a history management method for an image output apparatus connected via a network to at least one terminal apparatus and to a document management apparatus adapted to record access history information indicating a history of accesses to document data, said history management method comprising:

a reception step of receiving an output request for output of document data to which the terminal apparatus has accessed;

an execution step of executing processing based on the output request received in said reception step;

a processing history record step of recording processing history information indicating a history relating to the processing executed in said execution step; and a control step of performing control such that, in a case where a history of accesses from the terminal apparatus to the document data for which the output request has been received in said reception step has not been recorded as the access history information in the document management apparatus, a history relating to processing performed on the document data in said execution step based on the output request and information indicating that a history of accesses from the terminal apparatus to the document data has not been recorded in the document management apparatus are recorded as processing history information in said processing history record step;

wherein the document management apparatus is capable of managing authorities to access the document data on a user-by-user basis, wherein the method further comprises an identification step of identifying, based on the output request received by said reception step, a user from whom the output request has been issued and document data to be processed, a query step of making a query to the document management apparatus about an authority of the user identified by said identification step to access the identified document data, and a determination step of determining whether the processing can be executed by said execution step based on a response to the query from said query step to the document management apparatus about the authority to access the document data, and wherein in a case where said determination step has determined that said execution step can execute the processing, said execution step executes the processing in accordance with the processing request received by said reception step.

18. A non-transitory computer-readable storage medium including a history management program for causing a computer to execute a history management method for an image output apparatus connected via a network to a document management apparatus adapted to record access history information indicating a history of accesses to document data, said history management method comprising:

an input step of inputting document data;

an execution step of executing output processing on the document data inputted in said input step;

a processing history record step of recording processing history information indicating a history relating to the output processing executed in said execution step; and an access step of accessing the document management apparatus based on information to make access to the document management apparatus in a case where the information to make access to the document management apparatus is extracted from the document data on which the output processing has been executed in said execution step, said access step transmitting said processing history information relating to the output processing executed in said execution step to the document management apparatus in a case where access to the document management apparatus can be made in said access step, and said processing history record step recording the processing history information relating to the output processing executed in said execution step and information indicating that history information relating to the output processing has not been transmitted to the document management apparatus in a case where access to the document management apparatus cannot be made in said access step;

wherein:

the document data is attached with information that identifies the document data, the document management apparatus is capable of managing authorities to access the document data on a user-by-user basis, the image output apparatus performs a user identification step of identifying a user who has given an instruction for execution of the output processing by said execution step, and said access step notifies the document management apparatus of information indicating the user identified by the user identification step and the information that identifies the document data and to determine whether or not the output processing can be executed by the execution step in accordance with the instruction given by the user.

\* \* \* \* \*